United States Patent
Friel et al.

(10) Patent No.: US 7,250,464 B2
(45) Date of Patent: Jul. 31, 2007

(54) DISTRIBUTED PAINT MANUFACTURING SYSTEM

(75) Inventors: John Michael Friel, Warminster, PA (US); John William Hook, III, Warminster, PA (US); Jerry William Washel, Harleysville, PA (US); Bernhard Helmut Lieser, San Pedro, CA (US)

(73) Assignee: Rohm and Haas Company, Philadelphia, PA (US)

( * ) Notice: Subject to any disclaimer, the term of this patent is extended or adjusted under 35 U.S.C. 154(b) by 782 days.

(21) Appl. No.: 09/766,435

(22) Filed: Jan. 19, 2001

(65) Prior Publication Data

US 2003/0110101 A1   Jun. 12, 2003

(51) Int. Cl.
  *C08K 3/22*  (2006.01)
(52) U.S. Cl. .......................................... 524/497; 700/97
(58) Field of Classification Search .................. 705/26; 700/97, 285; 524/501, 502, 515, 523, 524, 524/533, 497
See application file for complete search history.

(56) References Cited

U.S. PATENT DOCUMENTS

| | | | |
|---|---|---|---|
| 4,243,430 A | 1/1981 | Sperry et al. | |
| 4,403,866 A * | 9/1983 | Falcoff et al. | 366/132 |
| 4,436,845 A | 3/1984 | Kitano | |
| 4,880,842 A | 11/1989 | Kowalski et al. | |
| 4,962,455 A | 10/1990 | Ishikawa et al. | |
| 5,078,302 A | 1/1992 | Hellenberg | 333/144 |
| 5,129,551 A | 7/1992 | Gott | 222/135 |
| 5,153,825 A * | 10/1992 | Yauk et al. | 705/1 |
| 5,268,849 A * | 12/1993 | Howlett et al. | 700/226 |
| 5,340,394 A * | 8/1994 | Elsamanoudi | 106/500 |
| 5,361,812 A * | 11/1994 | Arneson et al. | 141/275 |

(Continued)

FOREIGN PATENT DOCUMENTS

CA        935255       10/1973

(Continued)

OTHER PUBLICATIONS

Grundfelt-Forsius, Paint Production by Component Mixing, pp. 1-4.

(Continued)

*Primary Examiner*—Lynda Jasmin

(57) ABSTRACT

A paint manufacturing method includes receiving each of a group of fluid prepaints at different inputs of a fluid component mixing system, determining at a computer system a first fluid prepaint ratio, and mixing the fluid prepaints in accordance with the first ratio to form a base paint at an output of the mixing system. A paint manufacturing system includes a computer-controlled prepaint mixing system. The prepaint mixing system includes multiple fluid inputs providing for computer-controllable flow of prepaints into the mixing system. The computer system includes a memory storing software instructions that configured the computer system to receive user input selecting a base paint to be produced, determine a ratio of fluid prepaints needed to produce the base paint, and regulate each fluid flow control to establish, in the determined ratio, a flow of fluid prepaints entering the fluid mixing system. A paint manufacturing system includes multiple paint manufacturing sites that can each produce paint products. Each manufacturing site includes a site control computer to control a paint manufacturing process at the site and the system also includes a coordinating computer system that can exchange manufacturing operations data with each of the site control computers.

4 Claims, 7 Drawing Sheets

U.S. PATENT DOCUMENTS

| | | | |
|---|---|---|---|
| 5,493,840 A * | 2/1996 | Cane .............................. 53/50 |
| 5,521,234 A | 5/1996 | Brown et al. |
| 5,527,853 A | 6/1996 | Landy et al. |
| 5,643,669 A | 7/1997 | Tsuei |
| 5,672,649 A | 9/1997 | Brock et al. |
| 5,683,669 A * | 11/1997 | Hartmann et al. .......... 423/491 |
| 5,823,670 A | 10/1998 | Rushing et al. .......... 366/152.1 |
| 5,842,641 A | 12/1998 | Mazzalveri ................. 239/104 |
| 5,922,398 A * | 7/1999 | Hermes et al. ............. 427/137 |
| 5,923,398 A | 7/1999 | Goldman |
| 5,974,388 A * | 10/1999 | Durham ......................... 705/1 |
| 5,989,331 A | 11/1999 | Bauer et al. |
| 5,992,398 A | 11/1999 | Ho |
| 6,013,721 A | 1/2000 | Schall et al. |
| 6,073,055 A | 6/2000 | Jahn et al. .................... 700/97 |
| 6,197,879 B1 * | 3/2001 | Fischer et al. .............. 524/824 |
| 6,221,145 B1 * | 4/2001 | McClain ..................... 106/443 |
| 6,308,499 B1 | 10/2001 | Takada et al. |
| 6,330,487 B1 * | 12/2001 | Jahn et al. .................... 700/97 |
| 6,403,701 B1 | 6/2002 | Reusmann et al. |
| 6,412,658 B1 * | 7/2002 | Bartholomew et al. ........ 222/1 |
| 6,484,149 B1 * | 11/2002 | Jammes et al. ............... 705/26 |
| 6,507,824 B1 * | 1/2003 | Yon et al. ..................... 705/26 |
| 6,531,537 B2 * | 3/2003 | Friel et al. .................. 524/497 |
| 6,594,535 B1 * | 7/2003 | Costanza ..................... 700/97 |
| 6,720,380 B2 | 4/2004 | Hellmann et al. |
| 2002/0007867 A1 | 1/2002 | Takada et al. |

FOREIGN PATENT DOCUMENTS

| | | |
|---|---|---|
| EP | 0 614 951 A2 | 9/1994 |
| EP | 0 706 543 | 11/1997 |
| EP | 0915401 | 5/1999 |
| EP | 1 094 066 A2 | 4/2001 |
| EP | 0 915 401 B1 | 4/2004 |
| IE | 940666 | 8/1994 |
| WO | WO 94/25238 | 11/1994 |
| WO | WO 95/29960 | 11/1995 |
| WO | WO 98/05471 | 2/1998 |
| WO | WO00/37568 | 6/2000 |
| WO | WO 00/44834 | 8/2000 |
| WO | WO 01/90258 | 11/2001 |

OTHER PUBLICATIONS

Helander, Benefits of Delayed Product Differentiation.
Manufacturing Technology, Component Mixing-A New Approach to Customized Paint Production; pp. 156-157.
Helander, Impact of Form Postponement on Channel Members' Performance in Paint Business: A Theoretical Approach, pp. 225-237.
Orcun et al., Scheduling of Batch Processes: An Industrial Application in Paint Industry, pp. 673-678.
Dutheillet, Integrated Solution to Build Batch Processing Plants for Blending & Formulation Industries; pp. 37-44.
Benedetti, Method for Instantaneous Preparation of Varnishes and Paints, pp. 1-4.
Marchionni, Method for the Instant Preparation of Varnishes and Paints, pp. 1-10.
Rohm and Haas, The Manufacturing of Water-Base Paints in the Store, pp. 1-12.
Rohm and Haas, What is the DPS System: The Manufacturer in Your Store, pp. 1-18.
Dispensing Paint System (Italian).
Any Amount of Decorative Paint—Just-in-Time, Tint Systems.
"Custom Colours", Industrial and Materials Technologies, Jul. 1998 (2 pages).
Any Kind of Paint You Like, Innovation & Technology Transfer, Jul. 2000, p. 1-4.
"Paint Manufacturing Process Optimization For The Building Industry Using Original Bases And Pigments Formulation", Craft Synthesis Report, Dec. 10, 1996; (11 pages).
PS98A000005, Feb. 23, 1998, Colorificio, Translation.
Grundfelt-Forsius et al "Paint Production by Component Mixing", Faerg LackScan., 1997, (43(2)5-6 (Swedish translation).
Encyclopedia of Polymer Science and Engineering, John Wiley & Sons, Suppl., 1989, pp. 58-59.
Encyclopedia of Polymer Science and Engineering, John Wiley & Sons, Suppl., 1989, p. 64.
"Any Kind of Paint You Like", Innovation and Technology Transfer, Jul. 2000.
Patton, "Latex Critial Pigment Volume Concentration", Paint Flow and Pigment Dispersion, 1979, 193.

* cited by examiner

RMC * Markup = Base Price

| DB Code | Paint ID | Sheen Level | Tint Base | Use Type | Quality Level | TiO2 | PP1 Vol | PP2 Vol Exterior Extender | PP3 Vol Interior Extender | PP4 Vol PVA | PP5 Vol Flat Acrylic | PP6 Vol Gloss Acrylic | Water Vol | Markup Base Price |
|---|---|---|---|---|---|---|---|---|---|---|---|---|---|---|
| 1111 | 1 | Gloss | White | Exterior | Premium | 25.87% | 25.87% | 0.00% | 0.00% | 0.00% | 0.00% | 60.56% | 13.57% | $ 20.97 |
| 1112 | 2 | Gloss | White | Exterior | Improved | 27.34% | 27.34% | 0.00% | 0.00% | 0.00% | 0.00% | 51.21% | 21.45% | $ 19.96 |
| 1113 | 3 | Gloss | White | Exterior | Basic | 25.53% | 25.53% | 0.00% | 0.00% | 32.22% | 0.00% | 10.95% | 31.31% | $ 15.09 |
| 1121 | 4 | Gloss | White | Interior | Premium | 25.87% | 25.87% | 0.00% | 0.00% | 0.00% | 0.00% | 60.56% | 13.57% | $ 20.97 |
| 1122 | 5 | Gloss | White | Interior | Improved | 25.53% | 25.53% | 0.00% | 0.00% | 32.22% | 0.00% | 10.95% | 31.31% | $ 15.09 |
| 1123 | 6 | Gloss | White | Interior | Basic | 23.94% | 23.94% | 0.00% | 0.00% | 38.82% | 0.00% | 0.00% | 37.25% | $ 13.13 |
| 1211 | 7 | Gloss | Light | Exterior | Premium | 23.60% | 23.60% | 2.21% | 0.00% | 0.00% | 0.00% | 60.58% | 13.62% | $ 20.18 |
| 1212 | 8 | Gloss | Light | Exterior | Improved | 25.07% | 25.07% | 2.15% | 0.00% | 0.00% | 0.00% | 51.28% | 21.49% | $ 19.17 |
| 1213 | 9 | Gloss | Light | Exterior | Basic | 23.26% | 23.26% | 2.26% | 0.00% | 32.18% | 0.00% | 10.94% | 31.36% | $ 14.30 |
| 1221 | 10 | Gloss | Light | Interior | Premium | 23.60% | 23.60% | 0.00% | 2.21% | 0.00% | 0.00% | 60.58% | 13.62% | $ 20.20 |
| 1222 | 11 | Gloss | Light | Interior | Improved | 23.26% | 23.26% | 0.00% | 2.26% | 32.18% | 0.00% | 10.94% | 31.36% | $ 14.32 |
| 1223 | 12 | Gloss | Light | Interior | Basic | 21.67% | 21.67% | 0.00% | 2.15% | 38.89% | 0.00% | 0.00% | 37.30% | $ 12.36 |
| 1311 | 13 | Gloss | Mid | Exterior | Premium | 12.93% | 12.93% | 0.00% | 0.00% | 0.00% | 0.00% | 75.15% | 11.91% | $ 18.22 |
| 1312 | 14 | Gloss | Mid | Exterior | Improved | 13.67% | 13.67% | 0.00% | 0.00% | 0.00% | 0.00% | 66.63% | 19.70% | $ 17.05 |
| 1313 | 15 | Gloss | Mid | Exterior | Basic | 12.76% | 12.76% | 0.00% | 0.00% | 41.85% | 0.00% | 14.23% | 31.15% | $ 11.30 |
| 1321 | 16 | Gloss | Mid | Interior | Premium | 12.93% | 12.93% | 0.00% | 0.00% | 0.00% | 0.00% | 75.15% | 11.91% | $ 18.22 |
| 1322 | 17 | Gloss | Mid | Interior | Improved | 12.76% | 12.76% | 0.00% | 0.00% | 41.85% | 0.00% | 14.23% | 31.15% | $ 11.30 |
| 1323 | 18 | Gloss | Mid | Interior | Basic | 11.97% | 11.97% | 0.00% | 0.00% | 50.52% | 0.00% | 0.00% | 37.51% | $ 9.28 |
| 1411 | 19 | Gloss | Deep | Exterior | Premium | 0.00% | 0.00% | 0.00% | 0.00% | 0.00% | 0.00% | 89.74% | 10.26% | $ 15.47 |
| 1412 | 20 | Gloss | Deep | Exterior | Improved | 0.00% | 0.00% | 0.00% | 0.00% | 0.00% | 0.00% | 82.05% | 17.95% | $ 14.14 |
| 1413 | 21 | Gloss | Deep | Exterior | Basic | 0.00% | 0.00% | 0.00% | 0.00% | 51.49% | 0.00% | 17.51% | 31.00% | $ 7.51 |
| 1421 | 22 | Gloss | Deep | Interior | Premium | 0.00% | 0.00% | 0.00% | 0.00% | 0.00% | 0.00% | 89.74% | 10.26% | $ 15.47 |

Fig. 3A

| DB Code | Paint ID | Sheen Level | Tint Base | Use Type | Quality Level | PP1 Vol | PP2 Vol | PP3 Vol | PP4 Vol | PP5 Vol | PP6 Vol | Water Vol | Base Price |
|---|---|---|---|---|---|---|---|---|---|---|---|---|---|
| 1422 | 23 | Gloss | Deep | Interior | Improved | 0.00% | 0.00% | 0.00% | 51.49% | 0.00% | 17.51% | 31.00% | $ 7.51 |
| 1423 | 24 | Gloss | Deep | Interior | Basic | 0.00% | 0.00% | 0.00% | 62.22% | 0.00% | 0.00% | 37.78% | $ 5.43 |
| 2111 | 25 | SemiGloss | White | Exterior | Premium | 25.87% | 4.85% | 0.00% | 0.00% | 0.00% | 54.97% | 14.32% | $ 20.29 |
| 2112 | 26 | SemiGloss | White | Exterior | Improved | 27.34% | 4.38% | 0.00% | 0.00% | 0.00% | 46.15% | 22.13% | $ 19.34 |
| 2113 | 27 | SemiGloss | White | Exterior | Basic | 25.53% | 4.21% | 0.00% | 28.97% | 0.00% | 9.85% | 31.45% | $ 14.87 |
| 2121 | 28 | SemiGloss | White | Interior | Premium | 25.87% | 0.00% | 4.85% | 0.00% | 0.00% | 54.97% | 14.32% | $ 20.34 |
| 2122 | 29 | SemiGloss | White | Interior | Improved | 25.53% | 0.00% | 4.21% | 28.97% | 0.00% | 9.85% | 31.45% | $ 14.91 |
| 2123 | 30 | SemiGloss | White | Interior | Basic | 23.94% | 0.00% | 3.82% | 35.00% | 0.00% | 0.00% | 37.25% | $ 13.06 |
| 2211 | 31 | SemiGloss | Light | Exterior | Premium | 23.60% | 7.07% | 0.00% | 0.00% | 0.00% | 54.97% | 14.37% | $ 19.50 |
| 2212 | 32 | SemiGloss | Light | Exterior | Improved | 25.07% | 6.60% | 0.00% | 0.00% | 0.00% | 46.15% | 22.18% | $ 18.55 |
| 2213 | 33 | SemiGloss | Light | Exterior | Basic | 23.26% | 6.43% | 0.00% | 28.97% | 0.00% | 9.85% | 31.50% | $ 14.07 |
| 2221 | 34 | SemiGloss | Light | Interior | Premium | 23.60% | 0.00% | 7.07% | 0.00% | 0.00% | 54.97% | 14.37% | $ 19.57 |
| 2222 | 35 | SemiGloss | Light | Interior | Improved | 23.26% | 0.00% | 6.43% | 28.97% | 0.00% | 9.85% | 31.50% | $ 14.13 |
| 2223 | 36 | SemiGloss | Light | Interior | Basic | 21.67% | 0.00% | 6.04% | 35.00% | 0.00% | 0.00% | 37.30% | $ 12.29 |
| 2311 | 37 | SemiGloss | Mid | Exterior | Premium | 12.93% | 4.85% | 0.00% | 0.00% | 0.00% | 69.55% | 12.66% | $ 17.54 |
| 2312 | 38 | SemiGloss | Mid | Exterior | Improved | 13.67% | 4.41% | 0.00% | 0.00% | 0.00% | 61.54% | 20.38% | $ 16.43 |
| 2313 | 39 | SemiGloss | Mid | Exterior | Basic | 12.76% | 4.19% | 0.00% | 38.62% | 0.00% | 13.13% | 31.30% | $ 11.08 |
| 2321 | 40 | SemiGloss | Mid | Interior | Premium | 12.93% | 0.00% | 4.85% | 0.00% | 0.00% | 69.55% | 12.66% | $ 17.59 |
| 2322 | 41 | SemiGloss | Mid | Interior | Improved | 12.76% | 0.00% | 4.19% | 38.62% | 0.00% | 13.13% | 31.30% | $ 11.12 |
| 2323 | 42 | SemiGloss | Mid | Interior | Basic | 11.97% | 0.00% | 3.85% | 46.67% | 0.00% | 0.00% | 37.51% | $ 9.21 |
| 2411 | 43 | SemiGloss | Deep | Exterior | Premium | 0.00% | 4.86% | 0.00% | 0.00% | 0.00% | 84.13% | 11.00% | $ 14.79 |
| 2412 | 44 | SemiGloss | Deep | Exterior | Improved | 0.00% | 4.44% | 0.00% | 0.00% | 0.00% | 76.92% | 18.63% | $ 13.52 |
| 2413 | 45 | SemiGloss | Deep | Exterior | Basic | 0.00% | 4.17% | 0.00% | 48.28% | 0.00% | 16.41% | 31.14% | $ 7.29 |
| 2421 | 46 | SemiGloss | Deep | Interior | Premium | 0.00% | 0.00% | 4.86% | 0.00% | 0.00% | 84.13% | 11.00% | $ 14.83 |
| 2422 | 47 | SemiGloss | Deep | Interior | Improved | 0.00% | 0.00% | 4.17% | 48.28% | 0.00% | 16.41% | 31.14% | $ 7.33 |
| 2423 | 48 | SemiGloss | Deep | Interior | Basic | 0.00% | 0.00% | 3.89% | 58.33% | 0.00% | 0.00% | 37.78% | $ 5.36 |
| 3111 | 49 | Satin | White | Exterior | Premium | 23.48% | 12.04% | 0.00% | 0.00% | 46.02% | 0.00% | 18.46% | $ 18.09 |
| 3112 | 50 | Satin | White | Exterior | Improved | 20.87% | 10.42% | 0.00% | 0.00% | 36.65% | 0.00% | 32.06% | $ 15.34 |
| 3113 | 51 | Satin | White | Exterior | Basic | 15.66% | 13.58% | 0.00% | 22.87% | 6.15% | 0.00% | 41.74% | $ 10.22 |
| 3121 | 52 | Satin | White | Interior | Premium | 23.48% | 0.00% | 12.04% | 35.63% | 9.58% | 0.00% | 19.27% | $ 15.12 |
| 3122 | 53 | Satin | White | Interior | Improved | 20.87% | 0.00% | 10.42% | 35.83% | 0.00% | 0.00% | 32.87% | $ 12.34 |

Fig. 3B

| DB Code | Paint ID | Sheen Level | Tint Base | Use Type | Quality Level | PP1 Vol | PP2 Vol | PP3 Vol | PP4 Vol | PP5 Vol | PP6 Vol | Water Vol | Base Price |
|---|---|---|---|---|---|---|---|---|---|---|---|---|---|
| 3123 | 54 | Satin | White | Interior | Basic | 15.66% | 0.00% | 13.58% | 28.89% | 0.00% | 0.00% | 41.87% | $ 9.83 |
| 3211 | 55 | Satin | Light | Exterior | Premium | 21.21% | 14.26% | 0.00% | 0.00% | 46.02% | 0.00% | 18.51% | $ 17.30 |
| 3212 | 56 | Satin | Light | Exterior | Improved | 18.61% | 12.64% | 0.00% | 0.00% | 36.65% | 0.00% | 32.11% | $ 14.55 |
| 3213 | 57 | Satin | Light | Exterior | Basic | 13.39% | 15.80% | 0.00% | 22.87% | 6.15% | 0.00% | 41.79% | $ 9.42 |
| 3221 | 58 | Satin | Light | Interior | Premium | 21.21% | 0.00% | 14.26% | 35.63% | 9.58% | 0.00% | 19.32% | $ 14.35 |
| 3222 | 59 | Satin | Light | Interior | Improved | 18.61% | 0.00% | 12.64% | 35.83% | 0.00% | 0.00% | 32.92% | $ 11.57 |
| 3223 | 60 | Satin | Light | Interior | Basic | 13.39% | 0.00% | 15.80% | 28.89% | 0.00% | 0.00% | 41.92% | $ 9.06 |
| 3311 | 61 | Satin | Mid | Exterior | Premium | 11.74% | 21.02% | 0.00% | 0.00% | 48.58% | 0.00% | 18.66% | $ 14.27 |
| 3312 | 62 | Satin | Mid | Exterior | Improved | 10.44% | 18.54% | 0.00% | 0.00% | 38.78% | 0.00% | 32.24% | $ 11.93 |
| 3313 | 63 | Satin | Mid | Exterior | Basic | 7.83% | 19.43% | 0.00% | 24.30% | 6.54% | 0.00% | 41.90% | $ 7.56 |
| 3321 | 64 | Satin | Mid | Interior | Premium | 11.74% | 0.00% | 21.02% | 37.61% | 10.11% | 0.00% | 19.51% | $ 11.22 |
| 3322 | 65 | Satin | Mid | Interior | Improved | 10.44% | 0.00% | 18.54% | 37.92% | 0.00% | 0.00% | 33.10% | $ 8.83 |
| 3323 | 66 | Satin | Mid | Interior | Basic | 7.83% | 0.00% | 19.43% | 30.69% | 0.00% | 0.00% | 42.05% | $ 7.20 |
| 3411 | 67 | Satin | Deep | Exterior | Premium | 0.00% | 30.00% | 0.00% | 0.00% | 51.14% | 0.00% | 18.86% | $ 10.46 |
| 3412 | 68 | Satin | Deep | Exterior | Improved | 0.00% | 26.67% | 0.00% | 0.00% | 40.91% | 0.00% | 32.42% | $ 8.52 |
| 3413 | 69 | Satin | Deep | Exterior | Basic | 0.00% | 25.28% | 0.00% | 25.73% | 6.93% | 0.00% | 42.07% | $ 4.91 |
| 3421 | 70 | Satin | Deep | Interior | Premium | 0.00% | 0.00% | 30.00% | 39.59% | 10.65% | 0.00% | 19.76% | $ 7.32 |
| 3422 | 71 | Satin | Deep | Interior | Improved | 0.00% | 0.00% | 26.67% | 40.00% | 0.00% | 0.00% | 33.33% | $ 5.32 |
| 3423 | 72 | Satin | Deep | Interior | Basic | 0.00% | 0.00% | 25.28% | 32.50% | 0.00% | 0.00% | 42.22% | $ 4.57 |
| 4111 | 73 | Flat | White | Exterior | Premium | 23.48% | 20.79% | 21.26% | 0.00% | 34.80% | 0.00% | 20.93% | $ 16.70 |
| 4112 | 74 | Flat | White | Exterior | Improved | 18.83% | 23.25% | 34.69% | 0.00% | 25.57% | 0.00% | 32.35% | $ 13.38 |
| 4113 | 75 | Flat | White | Exterior | Basic | 15.66% | 26.36% | 44.65% | 19.80% | 5.32% | 0.00% | 32.87% | $ 10.56 |
| 4121 | 76 | Flat | White | Interior | Premium | 20.87% | 0.00% | 21.26% | 19.80% | 5.32% | 0.00% | 32.75% | $ 12.59 |
| 4122 | 77 | Flat | White | Interior | Improved | 15.66% | 0.00% | 34.69% | 16.67% | 0.00% | 0.00% | 32.99% | $ 10.21 |
| 4123 | 78 | Flat | White | Interior | Basic | 7.60% | 0.00% | 44.65% | 3.47% | 0.00% | 0.00% | 44.28% | $ 6.46 |
| 4211 | 79 | Flat | Light | Exterior | Premium | 22.35% | 21.90% | 0.00% | 0.00% | 34.80% | 0.00% | 20.95% | $ 16.30 |
| 4212 | 80 | Flat | Light | Exterior | Improved | 16.56% | 25.47% | 0.00% | 0.00% | 25.57% | 0.00% | 32.40% | $ 12.59 |
| 4213 | 81 | Flat | Light | Exterior | Basic | 13.39% | 28.58% | 0.00% | 19.80% | 5.32% | 0.00% | 32.92% | $ 9.77 |
| 4221 | 82 | Flat | Light | Interior | Premium | 18.61% | 0.00% | 23.47% | 19.80% | 5.32% | 0.00% | 32.80% | $ 11.82 |
| 4222 | 83 | Flat | Light | Interior | Improved | 13.39% | 0.00% | 36.91% | 16.67% | 0.00% | 0.00% | 33.04% | $ 9.44 |
| 4223 | 84 | Flat | Light | Interior | Basic | 5.33% | 0.00% | 46.87% | 3.47% | 0.00% | 0.00% | 44.33% | $ 5.69 |

Fig. 3C

| DB Code | Paint ID | Sheen Level | Tint Base | Use Type | Quality Level | PP1 Vol | PP2 Vol | PP3 Vol | PP4 Vol | PP5 Vol | PP6 Vol | Water Vol | Base Price |
|---|---|---|---|---|---|---|---|---|---|---|---|---|---|
| 4311 | 85 | Flat | Mid | Exterior | Premium | 11.74% | 29.84% | 0.00% | 0.00% | 37.29% | 0.00% | 21.13% | $ 12.88 |
| 4312 | 86 | Flat | Mid | Exterior | Improved | 9.42% | 30.38% | 0.00% | 0.00% | 27.70% | 0.00% | 32.51% | $ 10.33 |
| 4313 | 87 | Flat | Mid | Exterior | Basic | 7.83% | 31.93% | 0.00% | 21.44% | 5.77% | 0.00% | 33.03% | $ 7.92 |
| 4321 | 88 | Flat | Mid | Interior | Premium | 10.44% | 0.00% | 29.38% | 21.44% | 5.77% | 0.00% | 32.97% | $ 9.12 |
| 4322 | 89 | Flat | Mid | Interior | Improved | 7.83% | 0.00% | 40.26% | 18.75% | 0.00% | 0.00% | 33.16% | $ 7.59 |
| 4323 | 90 | Flat | Mid | Interior | Basic | 3.80% | 0.00% | 46.63% | 5.21% | 0.00% | 0.00% | 44.36% | $ 5.20 |
| 4411 | 91 | Flat | Deep | Exterior | Premium | 0.00% | 38.89% | 0.00% | 0.00% | 39.77% | 0.00% | 21.34% | $ 9.05 |
| 4412 | 92 | Flat | Deep | Exterior | Improved | 0.00% | 37.50% | 0.00% | 0.00% | 29.83% | 0.00% | 32.67% | $ 7.28 |
| 4413 | 93 | Flat | Deep | Exterior | Basic | 0.00% | 37.50% | 0.00% | 23.09% | 6.21% | 0.00% | 33.20% | $ 5.28 |
| 4421 | 94 | Flat | Deep | Interior | Premium | 0.00% | 0.00% | 37.50% | 23.09% | 6.21% | 0.00% | 33.20% | $ 5.64 |
| 4422 | 95 | Flat | Deep | Interior | Improved | 0.00% | 0.00% | 45.83% | 20.83% | 0.00% | 0.00% | 33.33% | $ 4.96 |
| 4423 | 96 | Flat | Deep | Interior | Basic | 0.00% | 0.00% | 48.61% | 6.94% | 0.00% | 0.00% | 44.44% | $ 3.94 |

Fig. 3D

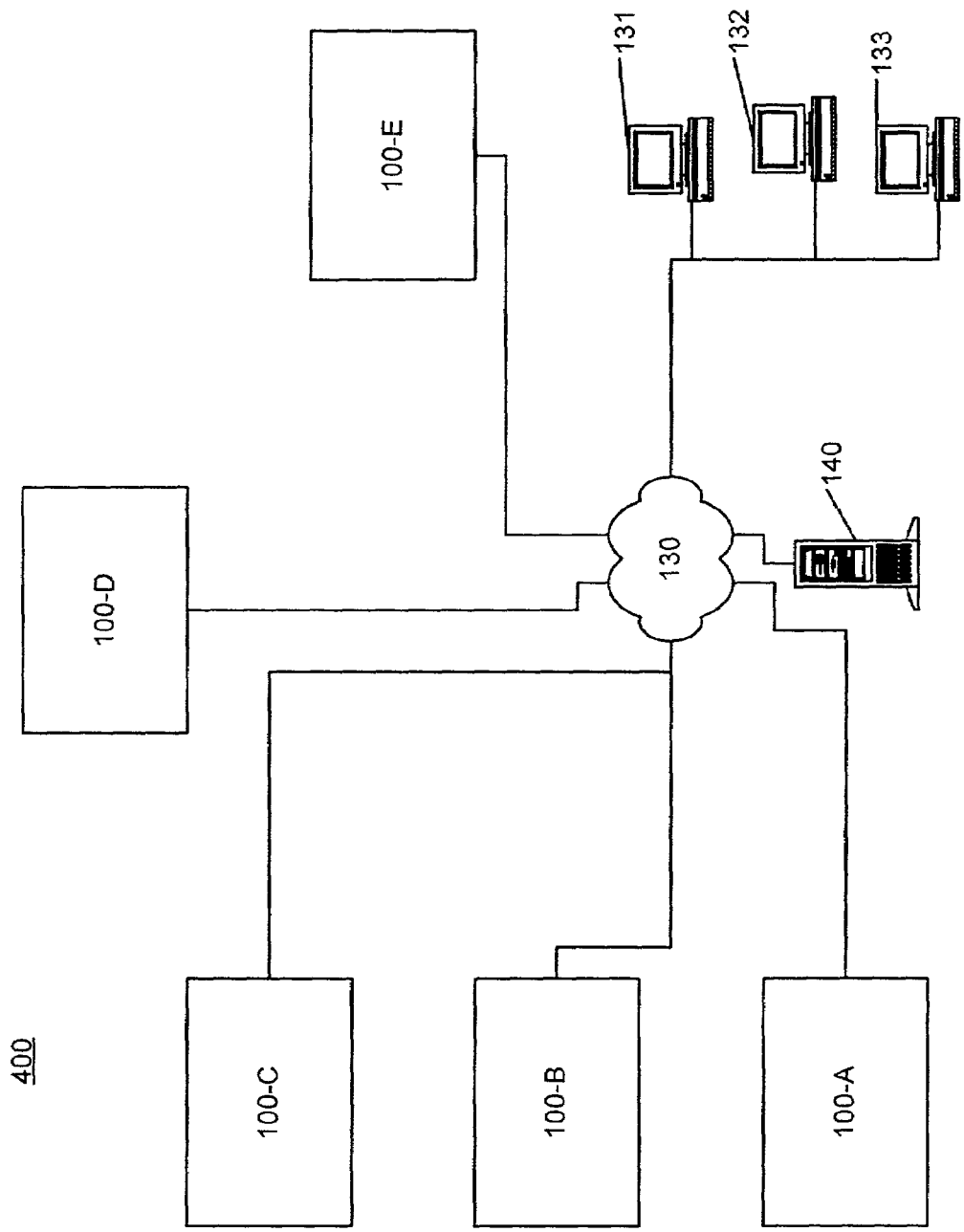

DISTRIBUTED PAINT MANUFACTURING SYSTEM

BACKGROUND OF THE INVENTION

Paint is a word used to cover a variety of materials such as enamels, lacquers, varnishes, undercoats, surfacers, primers, sealers, fillers, and stoppers. Most paints contain a pigment, a resin polymer which acts as a film-former and binder, to bind the pigment particles together, and a solvent as a dilutent. If the pigment is omitted, the paint is referred to as a varnish, sometimes referred to as an enamel, lacquer or topcoat. Lacquers are usually thermoplastic solution paints, whereas enamels are thermosetting paints.

Paint formulating involves the process of selecting the correct paint ingredients in the correct proportions to provide a paint with specific processing and handling properties, as well as the desired final paint properties. The major ingredients of a paint formulation are the binder, the pigment, optional pigment extenders, and water if the paint is a latex paint and solvents if the paint is an oil-based paint. Auxiliary ingredients include defoamers, coalescents, plasticizers, thickeners, non-thickening rheology modifiers, solvents, driers, anti-skinning agents, surfactants, mildewcides, biocides and dispersants. After the paint is formulated and applied to a surface, the paint dries by evaporation of the solvent and/or the water and the binder forms a film containing therein the pigment and the extender particles, if any.

Aqueous-based latex paints are widely used by do-it-yourselfers (DIY) and contractors. They are generally available in four sheens, i.e., gloss, semi-gloss, satin and flat. Sheen selection involves both aesthetic and practical considerations. Different gloss levels can be used to create visual interest as well as help extend the life of the paint. The sheen is determined by the volume of the binder(s), pigment(s), and extender(s), if any, in the paint formulation, as well as the type of binder(s), pigment(s) and extender(s) in the paint formulation.

In addition to the various sheens, paints are formulated to be untinted (white) or tinted to a wide variety of colors using different tint bases, including pastel or light tones, medium or mid-tones, and deep tones. Also, paints are formulated for exterior or interior use. Finally, paints are formulated to provide certain quality performance properties, e.g., good, better and best.

Retailers and manufacturers handle a wide variety of paint products so that the needs of particular users can be met. Paint products may differ in, among other things, sheen, tint base, use type, and quality levels. Sheen types may include (i) gloss, (ii) semigloss, (iii) eggshell, satin, or low luster, and (iv) flat). The number of tint bases depends on the variety of colors being offered and may be on the order of three or four. The use type may include (i) interior use and (ii) exterior use paints. Quality levels may include (i) basic, (ii) improved, and (iii) premium levels. A retailers or manufacturers offering all combinations of these four sheen levels, four tint bases, two use types, and three quality levels would need to handle ninety six different base paints to satisfy customer needs. On the retail level, this requires a large investment in stock and floor space. From a manufacturing perspective, a significant investment in manufacturing plants and equipment may be necessary to offer this large variety of paints. As a result of this large investment, it has been economically necessary to limit paint manufacturing plaints to large-scale operations. With respect to large scale paint manufacturing operations, is desirable to reduce manufacturing plant cost so that paint manufacturers can have more flexibility in locating their paint plants. With respect to retail outlets, it is desirable to reduce the variety of paint types that a retail store must stock, while still providing for the various paint types needed by consumers. Consequently, improved paint methods of formulating and manufacturing paint are desired.

SUMMARY OF THE INVENTION

In general, in one aspect, the invention features a paint manufacturing method. The method includes receiving each of a group of fluid prepaints at different inputs of a fluid component mixing system, determining at a computer system a first fluid prepaint ratio, and mixing the fluid prepaints in accordance with the first ratio to form a base paint at an output of the mixing system.

In general, in another aspect, the invention features a paint manufacturing system. The system includes a computer-controlled prepaint mixing system. The prepaint mixing system includes multiple fluid inputs providing for computer-controllable flow of prepaints into the mixing system. The computer system includes a memory storing software instructions that configured the computer system to receive user input selecting a base paint to be produced, to determine a ratio of fluid prepaints needed to produce the base paint, and to regulate each fluid flow control to establish, in the determined ratio, a flow of fluid prepaints entering the fluid mixing system.

Implementations may include one or more of the following features. Base paints produced by the system may be tinted to form colored paints. The system can produce multiple base paints from the fluid prepaints through the combination of the fluid prepaints in accordance with prepaint ratios associated with each of the other base paints. Base paints can have different application characteristics, such as sheen level. The mixing system may be an in-line mixing system that continuously flows fluid prepaints from its inputs to its output. Base paints can be produced without the addition of non-fluid components. In addition to the prepaints, other fluid components, such as water, may be mixed with the prepaints to form a base paint. Sensor data received at a control computer can be used to indicate a volume of each prepaint entering the mixing system and the computer system can dynamically adjust prepaint flow based on the received sensor data so as to maintain a desired prepaint ratio. The system may use a distributed computer system that includes multiple processing servers and database computers. The system can also include automated purchasing of paint products. To facilitate automated purchasing, the system can process customer orders which can include processing payment transactions by means of data interfaces to consumer credit card, debit card number, and checking account transaction clearing systems. The customer orders may be specified by received data that includes paint quantity and type identifiers. The system may mix paint in accordance with size specified in the customer order. Implementations may be adapted for small-batch (i.e., up to ten gallons) orders that are mixed at a point-of-sale location.

In general, in another aspect, the invention features a paint manufacturing system. The system includes multiple paint manufacturing sites that can each produce paint products. Each manufacturing site also includes a site control computer to control a paint manufacturing process at the site. The system also includes a coordinating computer system that is can exchange manufacturing operations data with each of the site control computers.

Implementations may include one or more of the following features. The site control computer can include instructions to control a ratio of manufacturing ingredients combined to produce paint. Exchanging manufacturing operations data can include receiving paint supply data at the coordinating computer system from each of the paint manufacturing sites, and the coordinating computer system can automatically schedule a supply delivery based on the received supply data. Each of the paint manufacturing sites can include a fluid mixing system configured to produce a base paint from a plurality of fluid prepaints and water. The coordinating computer system can be configured to receive customer order data from client computers, process received customer order data, and route the customer order data to one of the paint manufacturing sites. Routing of the customer order data can be based on site capacity data received at the coordinating computer system from the manufacturing sites. The manufacturing sites can include sites configured for small-batch point-of-sale operation.

The details of one or more embodiments of the invention are set forth in the accompanying drawings and the description below. Implementations may include one or more of the following advantages. Water-resistance, including resistance to blistering, wet adhesion, and scrub resistance of paints prepared using the invention herein may be improved because, among other things, the presence of thickeners in the pigment and extender prepaints, and preferably in the binder prepaints, permits one to use lesser amounts of stabilizing materials. In addition, there should be less viscosity fluctuation in the final paint formulation due to the equilibration of ingredients in the prepaints. Paint manufacturers can produce paint with a reduced ingredients inventory. Retail paint sellers may be able to reduce the paint inventory and/or floor space needed to offer a full line of paint products desired by consumers.

Other features, objects, and advantages of the invention will be apparent from the description and drawings, and from the claims.

DESCRIPTION OF THE DRAWINGS

FIGS. 3A–3D are exemplary database tables.
FIG. 4 depicts a distributed paint manufacturing system.

DETAILED DESCRIPTION OF THE INVENTION

Figure 1:
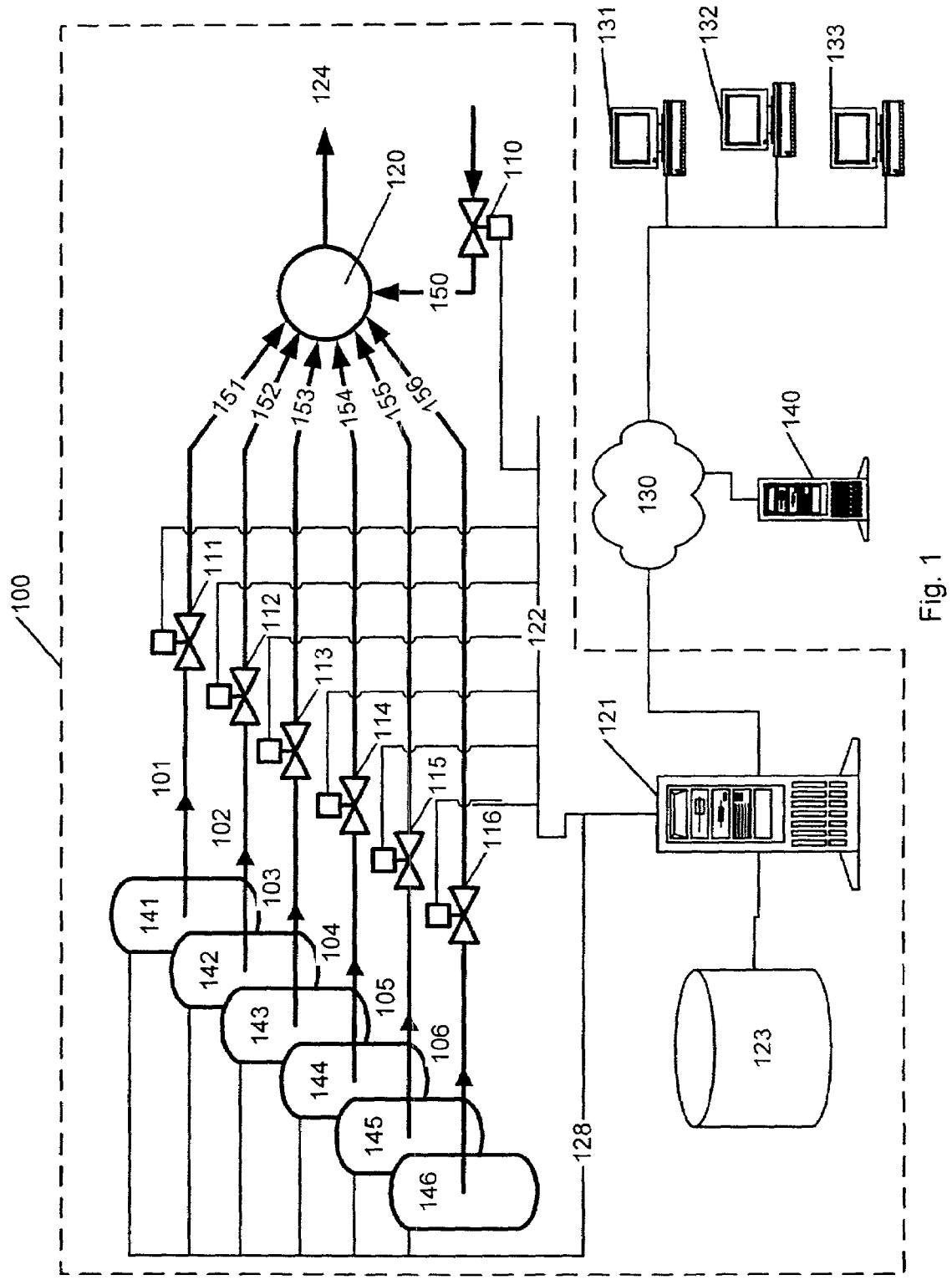
FIG. 1 depicts a paint manufacturing system.

FIG. 1 shows a paint manufacturing system 100 that can be used to manufacture different types of non-reactive base paints from a limited set of fluid prepaints. The system 100 can be adapted for both large-scale and small-scale paint manufacture, as well as paint manufacture at a retail point-of-sale. The system 100 can be used to manufacture a full line of paint products from a limited set of fluid pre-paints. Implementations of the system 100 can, thereby, be used to minimize the number of paint ingredients needed in a paint manufacturer's inventory, and/or to minimize the number of different paint types and retail floor space needed by a vendor selling a full line of paint products, In the text that follows, an exemplary implementation in which six different prepaints can be mixed to form ninety-six distinct base paints is described. The different base paints can be distinguished based on their end-use application characteristics. Descriptions of sets of example pre-paints follows the description of the system 100. Implementations may use other numbers of prepaints or may be configured to produce a different number of base paints. In the implementation that is described, base paints are paints to which colorants may be added to form a range of colored paints. That is, base paints are similar to paints commonly provided by manufacturers to retail locations and which are subsequently colored at the retail location in response to a color selection by a customer.

A base paint's end-use application characteristic are determined by the ratio of the prepaints combined by system 100 to produce the base paint. End-use application characteristics can include visual characteristics such as paint sheen (e.g., flat, satin, semi-gloss, or gloss), paint application environment (e.g., indoor or outdoor), quality (e.g., basic, improved, or premium), and base tint (e.g., white base, light base, mid-tone base, or deep base). Base tint determines the appearance of a paint when colorants are added to the base paint. A typical manufacturer's consumer paint line may include four different base tints which, by the addition of optional colorants, can provide an extensive palette of colors. These four paint sheens, two application environments, three quality levels, and four base tints, in all their permutations, form a collection of ninety-six base paints ($4\times2\times3\times4=96$) having different end-use application characteristics. A large number of colored paints may be formed from each base paint by the addition of colorants.

The paint manufacturing system 100 includes prepaint fluid inputs 101–106 that are connected by a valve or other adjustable flow control device 111–116 to a fluid mixing system 120. The valves may be pneumatically, hydraulically, magnetically, electrically, or otherwise controlled to moved between different flow positions (e.g., open and closed positions) and are operatively coupled to a computer system 121 by control links 122. The control links 122 can include additional valve control devices and systems. For example, links 122 can include controllers that modulate air pressure through pneumatic lines connected to pneumatic valves. The computer system can individually modulate the valves to control the ratio of prepaints 141–146 entering a mixing chamber 120. The ratio of prepaints 141–146 entering the mixing chamber 120 determines the composition of the base paint that is formed at an output 124 of the mixing system.

In some implementations, a feedback signal may be provided from each input valve 111–116 to the computer system to enable more precise control over the volume of each fluid entering the mixing chamber. The feedback signal may be produced by pressure measurement sensors, transit-time flowmeters, flow transducers, and other types of flow sensors. Pressure sensors (e.g., pitot tubes and venturi valves) generate a pressure signal based on pressure changes caused by flowing fluids. The pressure signal can processed by the computer system to infer fluid flow rates. A transit-time flowmeter can determine fluid flow rates by measuring the effect of a liquid's flow velocity on bi-directional acoustical signals exchanged between an upstream and a downstream transducer. Flow transducer sensors can be used to produce a feedback signal that varies based on movement of a rotor, paddle, or other physical apparatus inserted in the flowing fluid. Other types of fluid flow sensors also can be used. These feedback signals can be sent to computer 121 over the control network 122 or on a separate network. Implementations can also include data connections 128 to sensors and controlled apparatus located in the prepaint storage tanks 141–146. The data connections 128 can be used, e.g., connect volume monitoring sensors in the pre-paint tanks so that the computer system 121 can ensure adequate prepaint volumes before a manufacturing operation is initiated. Prepaint temperature and other data may also be collected from sensors in storage tanks 141–146. Data connections 128 also may be used to send control signals to apparatus located in the prepaint storage 141–146. For example, signals may be sent to temperature control apparatus or to a recirculating pump.

Figure 2:
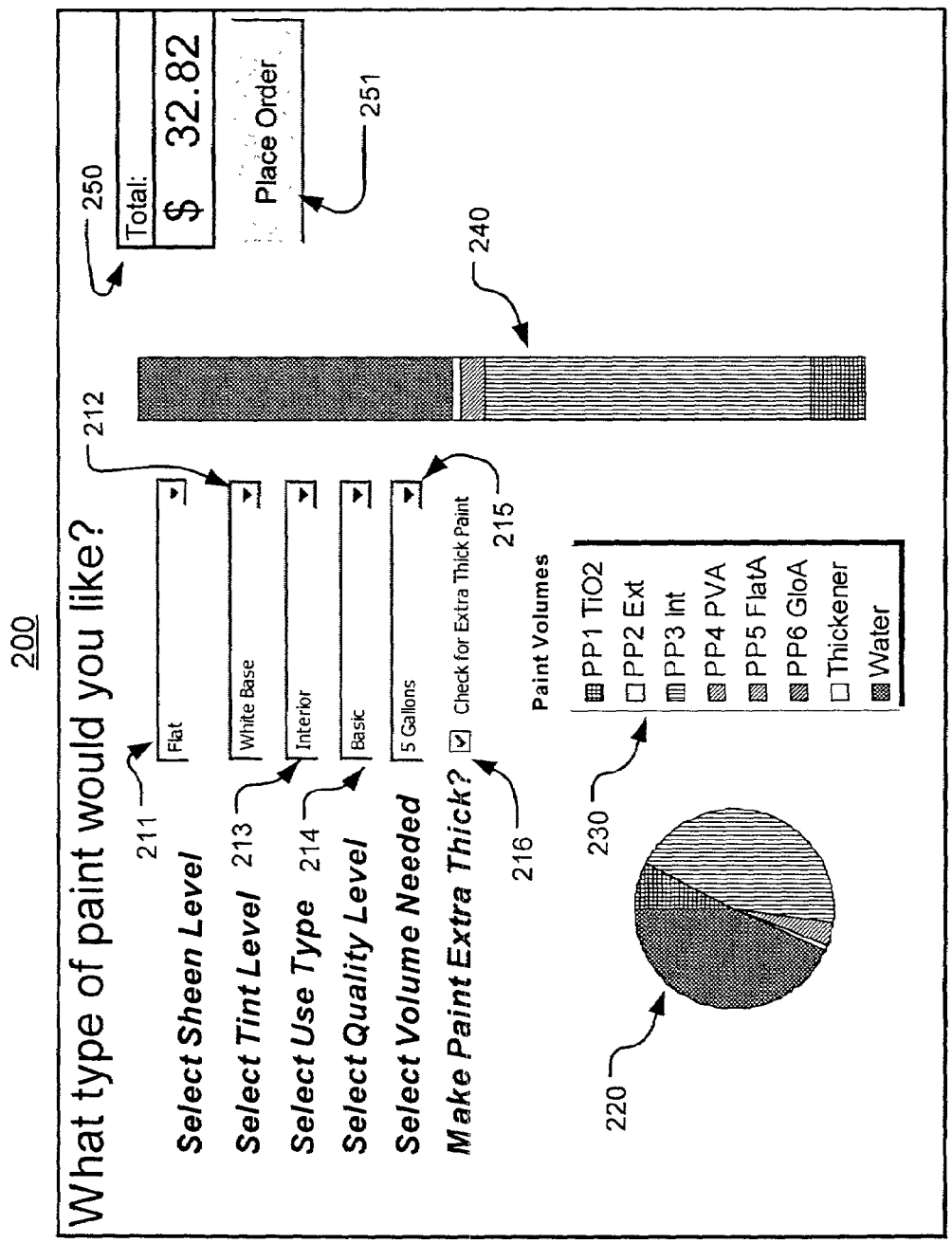
FIG. 2 is an exemplary user interface screen shot.

The computer system 121 receives paint selection input data that identifies a base paint to be produced. Paint selection input data may be received by an input device directly coupled to the computer system 121 and/or may be received over a network 130 from one or more client computers 131–133. FIG. 2 shows an example user interface which can be used to receive paint selection input data from a user. Internet-based technologies can be used to implement the user interface 200. For example, user interface 200 may be implemented using a hypertext markup language (HTML) form that is sent from a hypertext transfer protocol (HTTP) enabled computer 121 to a web browser (e.g., Microsoft Internet Explorer®, or Netscape Navigator®) that is executed at a client computer 131–133.

The interface 200 includes drop-down graphical user interface input controls 211–215 to receive a user's choice of a sheen level 211 (e.g., flat, satin, semi-gloss, gloss), a tint level 212 (e.g., white base, light base, mid-tone base, deep base), a use type 213 (e.g., interior, exterior), a quality level 214 (e.g., basic, improved, premium), and a volume to be produced 215. Implementations can also include special options such as the formulation of extra thick paint 216. Interface 200 includes charts 220 and 240 showing the relative volumes of the prepaints (identified by legend 230). In general, the use of such charts 220, 240 would be limited to sophisticated purchasers needing knowledge of particular paint formulations.

A user interface for do-it-yourself painters (i.e., a user interface used in a retail store or on a general-access web site) may be simplified. For example, charts 220, 240 and legend 230 can be eliminated and, rather than specifying the Tint level (212), the user may identify the color that the base paint is to be colored. Computer 121 can query a database 123 table to determine an appropriate tint level for the selected color. Such a database query may be implemented using a simple database table that includes records associating available colors with tint levels. It should be understood that available software and computer technologies allow a large number of other variations in the interface 200 and a large number of other types of interfaces for the receipt of paint selection input data. For example, a bar code scanner may be used to scan a bar code printed on a paint chip sample card. The data received from the bar code scan may be used to query a paint formulation database.

After the base paint selection data is received by the computer 121, a formulation of the base paint is determined. The base paint formulation can be determined by querying a database 123. FIGS. 3A–3D show portions of an example database table that specifies prepaint formulations used to produce the ninety-six different base paint formulations (i.e., all permutations of the four sheen levels, four base tints, two environmental applications, and three quality levels of the present exemplary implementation). The database table 3A–3D include ninety-six base paint formulation records (each being a separate row of the database table). Each base paint formulation record includes, among other things, six fields (shown in columns labeled "PP1_Vol", "PP2_Vol" "PP3_Vol" "PP4_Vol" "PP5_Vol" "PP6_Vol") that indicate relative quantities of each pre-paint in a particular base paint.

Base paint formulation records also can specify other fluids to be added to manufacture a particular base paint. For example, viscosity can be decreased by adding water (relative water quantity is indicated in the "Water_Vol" column) or increased by adding a thickening agent. The system 100 can include one or more fluid valves 110 through which this additional fluids are added. In some implementations, software-implemented algorithms, expert systems, and/or other programmed logic can be used to compute prepaint ratios.

After computing the ratio of prepaints, the computer system 121 controls prepaint 111–116 valves, and any other fluid 110 flow control valves, and processes feedback signals to control the volume of prepaints and fluids entering a mixing system 120. Implementations can use different types of mixing systems 120 to mix the prepaints and fluids. In an in-line continuous mixing implementation, the prepaints and any other fluids are simultaneously admitted to the mixing system 120 at relative flow rates substantially equal to the relative ratio of the prepaints desired in the final paint product. As the paints flow through the mixing system 120, they are combined in one or more mixing chambers to form a substantially uniform mix of the prepaints. In a simple example, an in-line continuous mixing system 120 can be formed by joining the fluid and prepaint lines 150–156 into a common output line 124. Baffles may be added to the output line 124 or placed in a chamber to help ensure uniform mixing of the fluids and prepaints. Alternatively, the computer system 121 can control the valves 150–156 to sequentially add a measured volume of each prepaint 141–146 to a fixed-capacity mixing chamber 120. When the needed volume of each prepaint is added to the mixing chamber, the prepaints may be agitated to combine them in a uniform mix.

In a small-batch implementation, the mixing chamber 120 can be a retail paint container (e.g., a quart-sized or gallon-sized paint can) and the system 100 can dispense each of the prepaints directly into the container. The container can then be manually capped and placed in a mixing/agitation machine to uniformly mix the pre-paints. A small-batch implementation may use measurement and dispensing hardware similar to that available in commercial dispensing systems (e.g., a Corob Stratos™ dispensing system or dispensing systems such as those manufactured by Fluid Management® or GSE Dispensing, Inc.). Such hardware can be supplemented by the unique software, data, networking, and prepaint components of system 100.

System 100 may include automated manufacture of paint products in response to a customer purchase order received at a terminal 131–133. In an Internet-enabled implementation, each terminal 131–133 may be a home computer executing web browser software and connected over a network 130 (e.g., the Internet) to the base paint manufacturing computer system 121. To process request from web browsers at the computers 131–133; the computer system 121 may include web server software that responds to hypertext transfer protocol (HTTP) request from the browsers. The web server software can be a process executed by the computer 121 or by another computer system 140. The web server responds to HTTP request from a web browser by sending hypertext markup language (HTML) data files (also known as web pages) to the browsers. Using web-based technologies, information can be provided to the user from a variety of different data systems 121 and 140 and the users can input data that are provided to different systems 121 and 140. This capability facilities the implementation of distributed versions of the manufacturing system of FIG. 1.

Returning again to FIG. 2, a user can enter a paint purchase order by activating a paint purchasing function (e.g., by clicking on the "Place Order" button 251). When the paint purchase function is initiated, data may be sent to an order processing computer 140 which, in turn, results in a purchase order form being returned to the client computer 131–133 and presented to the user. Purchase order data can then be entered at the client computer by a user and returned to the purchase order processing computer 140. The purchase order data may be input using a HTML-based form and can include a quantity of paint being ordered as well as payment information and a selection of a pickup or delivery address. Payment information can include, e.g., a credit card number, a debit card number, an account identifier, or a checking account identifier. Purchase order processing computer 140 may include an interface to a credit clearing computer to process credit card transactions. After the user's payment has cleared, the computer 140 may forward data to the paint manufacturing control computer 121 indicating the type and quantity of paint to produce. Naturally, using conventional computer hardware and software technology, the functions of the purchase order processing computer 140 and paint manufacturing computer 121 and any associated databases can be combined on a single computer or spread over a distributed network of computers and databases.

Implementations can use a computer system to process customer orders and distribute them among different paint manufacturing sites 100. FIG. 4 shows a distributed manufacturing implementation 400 wherein the order processing computer 140 is coupled over the network 130 to multiple (i.e., five) paint manufacturing sites (shown as blocks labeled 100A to 100E). Each of the paint manufacturing sites 100A to 100E of FIG. 4 can include the data processing and manufacturing equipment shown as included in element 100 of the implementation of FIG. 1. Other elements of FIG. 4 (i.e., network 130, clients 131–133, and order processing computer 140) may be similar to like-numbered elements of FIG. 1.

Referring to FIG. 4, the order processing computer 140 functions (a "coordinating computer system") can exchange manufacturing data with the manufacturing sites 100-A to 100-E. Manufacturing data can include, among other things, customer order data and the computer system 140 may include functionality to automatically route customer orders to an appropriate manufacturing site 100-A to 100-E. Customer orders may be routed based on the customer's geographic location. A customer may enter a delivery address, zip code, phone number or other identifier associated with a geographic location when placing an order at a client computer 131–133, and the order processing computer 140 can route the order to a manufacturing site 100-A to 100-E based on the location identifier. To route the order, the computer system 140 can query a database mapping the geographic identifier to a particular manufacturing site location. For example, the order processing system 140 may select a retail store at which the paint can be manufactured, route the order to that store, and inform the customer of the store's location. Routing of orders may be based on other factors such the cost to ship paint from a particular manufacturing site 100-A to 100-E to a final delivery point.

A manufacturing site 100-A to 100-E can also be selected by the system 140 based on available capacity or on availability of prepaints needed for a particular customer order. For example, the order processing system 140 may receive data from the control computer 121 at each site 100-A to 100-E indicating the amount of spare operating capacity of each of the sites and the volume of prepaints 141–146 at each site 100-A to 100-E. The manufacturing site can then be selected based on available capacity and prepaint supplies. In some cases, the order processing system 140 may determine that no single site has adequate capacity; in such cases, an order may be split among multiple sites. The order processing system 140 may also use capacity data and supply information to automatically schedule deliveries of raw materials, i.e., prepaints, to a site 100-A to 100-E.

As discussed, the prepaints used in the system 100 are selected so that they can be used to form multiple different base paints. To do so, it is desirable that the prepaints be mutually compatible. Mutually compatible prepaints are those that can be combined without undesirable side effects. In addition, the prepaints may be selected so that they form a non-reactive base paint. As used herein, in a reactive paint, combining the ingredients of the paint initiates a progressive chemical reaction curing the paint. In contrast, in a non-reactive paint, combining the ingredients of the paint does not lead to a rapid progressive chemical reaction curing the paint. Water-based latex paints are an example of a non-reactive paint.

In some implementations, the base paint manufacturing system 100 may be combined with a system to add colorants directly to the mixing system 120 to produce a final tinted paint product. Alternatively, the output 124 may be coupled to a separate colorant system or the base paint may be put into one-gallon cans, barrels, or other containers and tinted at a later time. Implementations of the system 100 may dynamically change the type of paint being produced. For example, in a small-batch implementation, after producing a gallon of a glossy interior paint, the computer 121 can alter the flow rate of the valves 111–116 so as to set the system 100 to produce a gallon of glossy exterior paint.

Methods of formulating and selecting prepaints will now be described.

To formulate prepaints, one needs to consider the range of key properties required by the complete paint line and formulate a set of ingredients (hereinafter referred to as "prepaint") which are capable of being blended in various combinations to cover the key properties required for the particular paint line. The number of prepaints required will depend on how flexible the final matrix of paint needs to be. Specific properties can be improved by adding paint additives which enhance the desired property.

We have discovered that we are able to achieve this goal by employing a set of N prepaints sufficient to formulate at least 2N different paints, including:
1. at least one fluid prepaint x, including at least one white opacifying pigment;
2. at least one fluid prepaint y, including at least one extender pigment; and
3. at least one fluid prepaint z, including at least one polymeric binder;
   wherein N is at least 3, preferable 3–10;
   wherein the minimum number of each of prepaint x, y, and z is 1; and
   wherein the maximum number of each of prepaint x, y, and z is N−2; and
   wherein prepaints x, y, and z are mutually compatible.

We have also discovered a method of rationalizing the number and types of ingredients to formulate a complete set of paints, including the steps of:
1. providing a set of N prepaints sufficient to formulate at least 2N different paints, including:
   a. at least one fluid prepaint x, including at least one white opacifying pigment;

b. at least one fluid prepaint y, including at least one extender pigment; and c. at least one fluid prepaint z, including at least one polymeric binder;

wherein N is at least 3, preferable 3–10;

wherein the minimum number of each of prepaint x, y, and z is 1; and wherein the maximum number of each of prepaint x, y, and z is N−2; and wherein prepaints x, y, and z are mutually compatible;

2. dispensing predetermined amounts of prepaint(s) x, prepaint(s) y, and prepaint(s) z into a container or an application device to form a paint.

The method may further include the step of mixing prepaint(s) x, prepaint(s) y, and prepaint(s) z before or after they are dispensed into the container of before they are dispensed into the application device.

The method may further include the step of adjusting the viscosity of dispensed prepaints before or after they are dispensed into the container or before they are dispensed into the application device using thickener, water or a mixture thereof.

The method may further include the step of adding additional materials that enhance the application or final performance properties of the paint.

The method may further include the step of adding at least one colorant to the dispensed prepaints.

The method may be carried out at a paint manufacturing facility, a point-of-sale or at point-of-use and may be controlled by a computer.

If one key property is varied (for example, sheen level, tint base, use type, or quality type) then the complete set of paints can be made from one each of prepaint x, prepaint y and prepaint z (N=3). The complete set of paints will contain at least 6 paints (2N), preferably 9 paints (3N), more preferably 12 paints (4N) and most preferably 15 paints (5N). If two key properties are varied (for example, two selected from sheen level, tint base, use type, and quality type) then the complete set of paints can be made from at least one each of prepaint x, prepaint y and prepaint z and least one additional prepaint x, y or z (N=4), which depends on which key properties are to be varied. The complete set of paints will contain at least 8 paints (2N), preferably 12 paints (3N), more preferably 16 paints (4N) and most preferably 20 paints (5N).

If three key properties are varied (for example, three selected from sheen level, tint base, use type, and quality type) then the complete set of paints can be made from at least one each of prepaint x, prepaint y and prepaint z and at least two additional prepaint x, y or z (N=5), which depends on which key properties are to be varied. The complete set of paints will contain at least 10 paints (2N), preferably 15 paints (3N), more preferably 20 paints (4N) and most preferably 25 paints (5N).

If four key properties are varied (for example, four selected from sheen level, tint base, use type, and quality type) then the complete set of paints can be made from at least one each of prepaint x, prepaint y and prepaint z and at least three additional prepaint x, y or z (N=6), which depends on which key properties are to be varied. The complete set of paints will contain at least 12 paints (2N), preferably 18 paints (3N), more preferably 24 paints (4N) and most preferably 30 paints (5N).

This technique may be continued to vary as many additional key properties as desired.

In each of the above examples one is designing the prepaints so that they cover a wide formulation space so that the desired final paint properties lie within the blend space defined with the prepaints at the vertices. In many cases the prepaints will not by themselves be practical paints. But by pushing the prepaints to these extremes one can maximize the blend space available for the system. When the prepaints, additives and colorants are all fully compatible, they can be blended at any ratio without inducing colloidal instability, and one can blend them in any combination needed to achieve the desired paint profile.

This technique is similar to the design principles used in statistical experimental design and analysis of mixture component designs, however, instead of designing a mixture space to explore the response surface within it, one is designing the boundaries of the mixture space to maximize the flexibility of the paint system. The key to success is to have full compatibility of the individual ingredients and prepaints across the mixture space.

Paint properties can be predicted in a number of ways. One approach is to develop response surface models of the blend space using standard Mixture Component experimental design statistical tools. These simple statistical models can then be used by a linear optimization program, by a massive grid search or by a graphical analysis tool. Another approach is to simply use empirical methods to determine which blends are needed for specific paint lines, then incorporate those simple empirical recipes in the paint making machine software.

An extension of the techniques is to have the paint machine automatically pretest certain key properties (e.g., viscosity, forced dry gloss or color) and make minor adjustments during the formulating of the paint from prepaints. Having feedback loops in the paint machine can provide more precise matching of color, gloss, and viscosity targets.

As used herein, paint ingredients are "compatible" if they can be combined in the various prepaints to provide the desired properties without any negative side effects on other paint ingredients in the prepaint and on the properties that the other ingredients are intended to provide in the final paint. The paint ingredients also have to be compatible in the final paint which is formulated by mixing the various prepaints. If the prepaints, optional additives included to enhance specific paint properties, and colorants are fully compatible, i.e., they can be blended at any ratio without inducing colloidal instability, then they can be blended in any combination falling within the formulation space needed to achieve the desired property profile in the final paint.

It is preferred that the all fluid prepaints employed in the method of the invention have the same or similar viscosities to aid in mixing.

The water-resistance properties, including blister resistance, wet adhesion, and scrub resistance of the final paints prepared by the method of the invention, are expected to be improved because of the use of lower amounts of stabilizing materials such as surfactants. In addition, viscosity fluctuation in the final paint formulation are expected to reduced because of the equilibration of ingredients in the prepaints.

The above prepaints are formulated to maximize the flexibility of paint manufacturing. Rather than purchasing individual paint ingredients, paint manufacturers and even buyers at point-of-sale and point-of-use (paint stores, paint departments, contractors and homeowners), can purchase the set of prepaints to prepare a complete set of paints. These sets of prepaints will contain at least one each of prepaints x, y and z and possibly additional variants of each depending upon the formulating flexibility desired. Optionally, the above prepaints are mixed with an additional prepaint which includes at least one colorant, such as a colored pigment or dye.

The method of the present invention is not limited to preparing only latex paints per se but may also be extended to prepare any aqueous coating, or related building product requiring point-of-sale mixing of ingredients, including, sealants, caulks, mastics, adhesives and other building-related products.

In one embodiment of prepaint x, it is a fluid titanium dioxide prepaint consisting essentially of at least one white opacifying pigment, at least one dispersant, at least one thickener, and water; wherein the dispersant(s) and the thickener(s) are compatible with the pigment(s) and with the other paint ingredients, and wherein the prepaint has a volume solids content of about 30 to about 70%, preferably 35 to 50% and a Stormer viscosity of about 50 to about 250 KU, preferably about 60 to about 150 KU.

In a alternate embodiment of prepaint x, it is a fluid titanium dioxide prepaint useful for formulating a one pack, pigmented latex paint containing other paint ingredients, which prepaint consists essentially of at least one white opacifying pigment, at least one dispersant, at least one thickener, at least one film-forming or nonfilm-forming polymer, and water; wherein the dispersant(s), the thickener(s), and the polymer(s) are compatible with the pigment(s) and with the other paint ingredients, and wherein the prepaint has a volume solids content of about 30 to about 70%, preferably about 35 to about 50%, a PVC of about 35 to less than 100%, preferably 50 to less than 100%, and a Stormer viscosity of about 50 to about 250 KU, preferably about 60 to 150 KU. Preferably, the polymer is adsorbed onto the white opacifying pigment.

In one embodiment of prepaint y, it is a fluid pigment extender prepaint which consists essentially of at least one mineral extender, at least one thickener, an optional polymer and water; wherein the pigment extender prepaint has a volume solids content of about 30 to about 70%, preferably about 35 to about 65%, a PVC of about 35 to 100%, preferably about 40 to 100%, and a Stormer viscosity of about 50 to 250 KU, preferably about 60 to about 150 KU; and wherein the prepaints ingredients are compatible with each other and with the ingredients of the other prepaints.

In one embodiment of prepaint z, it is a fluid polymeric binder prepaint which consists essentially of a water-borne polymeric binder having a Tg of about −30° C. to about 70° C., preferably about −10° C. to about 60° C., and water; wherein the binder prepaint has a volume solids content of about 25 to about 70%, preferably about 30 to about 65%, and a Brookfield viscosity of less than 100,000 centipoise, preferably about 100 to about 50,000 centipoise, at a shear rate of 1.25 reciprocal seconds; and wherein the prepaints ingredients are compatible with each other and with the ingredients of the other prepaint.

In the embodiments of prepaints x, y and z, it is possible to have minor amounts, i.e., less than 10% by weight, based on the total weight of the prepaint, of conventional paint additives including acid, base, defoamer, coalescent, cosolvent, mildewcide, biocide, antifreeze agent and the like. These additives must be compatible with the other paint ingredients in the prepaint and the prepaints employed in the method.

White opacifying pigments useful in the method and prepaint of the invention include white pigments which impart white scattering power to the paint across all visible wave lengths without a high degree of absorption. Pigment extenders are non-settling (without agitation) inorganic solids or opaque polymers which do not impart the primary color or hiding power to the paint although they may have secondary influences on those properties. The tint bases used for deep tone paints typically contain no or only very low levels of white opacifying pigments.

Suitable white opacifying pigments include titanium dioxide ($TiO_2$) or a combination of titanium dioxide and auxiliary hiding pigments such as voided latex polymer particles, zinc oxide, lead oxide, a synthetic polymer pigment and mixtures thereof. Rutile and anatase grades of titanium dioxide are suitable for use herein. Rutile titanium dioxide is preferred. The surface of these titanium dioxides may be treated with various organic surface treatments or inorganic surface treatments, e.g., as the oxides of silica, alumina, and zirconia. Fumed titanium oxide is also useful herein.

The voided latex particles useful in the method of the invention have a particle size diameter of 100 nm to 2,000 nm and a void fraction of 10% to 75%. Preferably, the voided latex particles useful in the method of the invention have a particle size of 500 nm to 1,100 nm. Preferably, the voided latex particles have a single void. The voided latex particles have a glass transition temperature, as measured by differential scanning calorimetry at a rate of 20° C., of at least about 20° C., preferably at least about 50° C. The higher the glass transition temperature, the harder the particle is and less likely it is to collapse. If the voided latex particles collapse, they are unable to contribute to hiding. They may be prepared by conventional polymerization processes known in the art, such as those disclosed in U.S. Pat. Nos. 3,784,391, 4,798,691, 4,908,271, and 4,972,000, the disclosures of which are incorporated herein by reference, as well as Japanese Patent Applications 60/223,873, 61/62510, 61/66710, 61/86941, 62/127336, 62/156387, 01/185311, and 02/140272. Preferably, the voided latex particles are prepared according to U.S. Pat. Nos. 4,427,836, 4,469,825, 4,594,363, 4,880,842 and 5,494,971, the disclosure of which are incorporated herein by reference.

Suitable film-forming or non-film-forming polymers include homopolymers, copolymers or terpolymers selected from the group consisting of acrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic and mixtures thereof.

Extenders pigments useful herein include exterior and interior extender pigments optimized for the intended end use. Exterior extender pigments are not soluble in water, have a low absorption number, and provide tint retention. They are optimized for exterior durability in the particular market where the paint will be sold, are non-cracking, non-chalking, and non dirt retention. They also provide low cost volume. Interior extender pigments are optimized for hiding, gloss, and low cost. Suitable extender pigments include barium sulfate (1–15 microns), Blanc Fixe (0.5–5 microns), calcium carbonate (0.05–35 microns), silica (0.001–14 microns), magnesium silicate (0.5–15 microns), aluminum silicate (0.2–5 microns), mica, bentonite, magnesium alumino-silicate, fumed allumina, colloidal attapulgite, synthetic amorphous sodium alumino-silicate, and sodium potassium alumino-silicate, and the like.

Binders are polymers or prepolymers which form the primary film of the paint. Binders bind the pigment and/or extenders, provide the required paint flow, and determine the gloss and hardness of the final paint film. The binders selected for the prepaints will depend upon the final use of the formulated paints. Binders suitable for exterior paints are generally suitable for interior paints, but that binders suitable for interior paints may not be suitable for exterior paints.

Suitable binders include, but are not limited to, film-forming homopolymers, copolymers or terpolymers selected from the group consisting of acrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic and mixtures thereof.

Thickener is a general term which includes any material added to a paint to modify its Theological profile. Preferred thickeners are associative thickeners. Suitable thickeners for use herein include polyvinyl alcohol (PVA); hydrophobically-modified alkali soluble emulsions, known in the art as HASE emulsions; alkali soluble emulsions, known in the art as ASE emulsions; hydrophobically modified ethylene oxide-urethane emulsions known in the art as HEUR emulsions; and cellulosic thickeners such as hydroxy methyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite class and other types of clay, titanate chelating agents, and the like.

Suitable dispersants for use herein include non-ionic, anionic and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Anionic polymers such as homopolymers and copolymers based on polycarboxylic acids, including those that have been hydrophobically- or hydrophilically-modified, e.g., polyacrylic acid or polymethacrylic acid or maleic anhydride with various monomers such as styrene, methacrylate, diisobutylene, and other hydrophilic or hydrophobic comonomers are also suitable for use as dispersants.

Suitable defoamers include silicone-based and mineral oil-based defoamers, and the like.

Coalescents are not necessary if solvent-free polymeric binders are used in the binder prepaints. Solvent-free binders typically have a low Tg and low minimum film-forming temperature. If a coalescent is required, part of the water in the binder prepaints is replaced with the coalescent.

Suitable solvents include ethylene glycol, propylene glycol, hexylene glycol, 2,2,4-trimethyl-1,3-pentanediol monoisobutyrate (TEXANOL), glycol ethers, mineral spirits, methyl carbitol, butyl carbitol, phthalates, adipates, and the like.

Suitable mildewcides and biocides include zinc oxide, isothiazolones, triazoles, and the like.

Suitable surfactants include cationic, anionic, and non-ionic surfactants.

EXAMPLES

Test Procedures

The Stormer viscosity of the prepaints is measured using ASTM method D562.

The Brookfield viscosity of the binder prepaints and final paints is measured using spindle #4 of a Brookfield viscometer at 6 rpm.

The ICI viscosity of the prepaints and paints is measured using ASTM method D3205-77.

Example 1

This example describes the preparation of a white prepaint which was prepared by combining the following ingredients:

| Ingredient | Amount (lbs./100 gallons) |
|---|---|
| Pigment - Titanium Dioxide Slurry (76.5% solids) (Ti-Pure R-746 - DuPont) | 1152.25 |
| Dispersant (Tamol 1124 - Rohm & Haas) | 7.06 |
| Defoamer (Drewplus L-475) | 1.00 |
| Binder Acrylic (50% solids - Tg 28° C. (Rhoplex SG - 10M - Rohm & Haas) | 166.32 |
| Opacifer - Voided Latex Particles (Ropaque ® OP-96 - Rohm & Haas) | 151.80 |
| Coalescent (Texanol) | 12.95 |
| Rheology Modifier (Acrysol RM-8W - Rohm & Haas) | 12.76 |
| Base - Ammonia (28%) | 1.65 |

The prepaint was prepared using a laboratory mixer having a 45° pitch stirring blade. The water, dispersant, and defoamer, were combined and mixed. The titanium dioxide slurry was slowly added and the mixture was stirred for 15–20 minutes. The binder, coalescent, rheology modifier, ammonia, and additional water, if necessary, were then added.

The resulting prepaint had a total volume of 100 gallons, a total weight of 1,505.80 lbs., a total PVC of 80.00%, a volume solids of 44.00%, a weight solids of 67.14%, a density of 15.0580 lbs./gallon, 0.40% dispersant on pigment solids, and 10.00% coalescent on latex solids. Its initial and equilibrated Stormer viscosities were 88 and 90 KU. Its initial and equilibrated pH values were 8.8 and 8.6.

Example 2

This example describes the preparation of an exterior pigment extender prepaint. It was prepared as above by combining the following ingredients:

| Ingredient | Amount (lbs./100 gallons) |
|---|---|
| Pigment - Nephilene Syenite (7.5 µ) (Minex 4) | 784.30 |
| Dispersant (Tamol 1124 - Rohm & Haas) | 7.84 |
| Defoamer (Drewplus L-475) | 2.00 |
| Binder Acrylic (53.5% solids - Tg 18° C.) (Rhoplex ML-200 - Rohm & Haas) | 157.49 |
| Coalescent (Texanol) | 5.90 |
| Rheology Modifier (Acrysol RM-8W - Rohm & Haas) | 2.55 |
| Water | 368.86 |

The resulting prepaint had a total volume of 100 gallons, a total weight of 1,328.94 lbs., a total PVC of 80.00%, volume solids of 45.00%, a weight solids of 65.36%, a density of 13.2894 lbs./gallon, 0.50% total dispersant on pigment solids and 7.00% total coalescent on binder solids. The initial and equilibrated Stormer viscosities were 90 and 93. The initial and equilibrated pH values were 8.9 and 8.7.

Example 3

This example describes the preparation of an interior pigment extender prepaint which was prepared as described above by combining the following ingredients:

| Ingredient | Amount (lbs./100 gallons) |
| --- | --- |
| Pigment - Calcium Carbonate (12 μ) (Omyacarb 12) | 405.67 |
| Pigment - Calcium Carbonate (3.2 μ) (Vicron 15-15) | 203.59 |
| Pigment - Aluminum Silicate (1.4 μ) (Optiwhite) | 165.41 |
| Dispersant (Tamol 1124 - Rohm & Haas) | 7.75 |
| Defoamer (Drewplus L-475) | 1.00 |
| Binder - Vinyl Acetate/Acrylic (55% solids - Tg 14° C.) (RES 3803) | 157.61 |
| Coalescent (Texanol) | 6.07 |
| Rheology Modifier - HEUR (Acrysol RM-2020-NPR) | 17.53 |
| Base - Ammonia (28%) | 0.87 |
| Water | 356.59 |

The resulting prepaint had a total volume of 100 gallons, a total weight of 1,322.09 lbs., a total PVC of 80%, a volume solids of 45%, a weight solids of 65.15%, a density of 13.2210 lbs./gallon, 0.50% dispersant on pigment solids, and 7.00% coalescent on binder solids, Its initial and equilibrated Stormer viscosities were 94 and 97. Its initial and equilibrated pH values were both 9.2.

Example 4

This example describes of a vinyl acetate/acrylic binder prepaint was prepared as described above except that the binder, defoamer, coalescent, ammonia, water, and rheology modifier were combined and mixed. The ingredients and amounts were as follows:

| Ingredient | Amount (lbs./100 gallons) |
| --- | --- |
| Defoamer (Drewplus L-475) | 8.00 |
| Binder - Vinyl Acetate/Acrylic (55% solids - Tg 14° C.) (RES 3803) | 788.06 |
| Coalescent (Texanol) | 30.34 |
| Rheology Modifier - HEUR (Acrysol SCT-275 - Rohm & Haas) | 3.02 |
| Base - Ammonia (28%) | 1.95 |
| Water | 60.08 |

The resulting prepaint had a total volume of 100 gallons, a total weight of 891.45 lbs., a volume solids of 45.00%, a weight solids of 48.62%, a density of 8.9144 lbs./gallon and 7.00% coalescent on binder solids. Its initial and equilibrated Stormer viscosities were 88 and 90. Its initial and equilibrated pH values were 8.6 and 8.4. It's equilibrated Brookfield viscosity should be less than 10,000 cps.

Example 5

This example describes a flat acrylic binder prepaint which prepaint was prepared as above by combining the following ingredients:

| Ingredient | Amount (lbs./100 gallons) |
| --- | --- |
| Defoamer (Drewplus L-475) | 8.00 |
| Binder - Acrylic (53.5% solids - Tg 18° C.) (Rhoplex ML-200 - Rohm & Haas) | 769.96 |
| Coalescent (Texanol) | 28.83 |
| Rheology Modifier (HEUR) (Acrysol RM-8W - Rohm & Haas) | 1.15 |
| Base - Ammonia (28%) | .57 |
| Solvent - Propylene Glycol | 60.00 |
| Water | 12.84 |

The resulting prepaint had a total volume of 100 gallons, a total weight of 881.35 lbs., a volume solids of 44.00%, a weight solids of 46.74%, a density of 8.8133 lbs./gallon, and 7.00% coalescent on binder solids. Its initial and equilibrated Stormer viscosities were 91 and 89. Its initial and final pH values were both 8.9/9.0. It's equilibrated Brookfield viscosity should be less than 10,000 cps.

Example 6

This example describes a gloss acrylic binder prepaint which prepaint was prepared as described above by combining the following ingredients:

| Ingredient | Amount (lbs./100 gallons) |
| --- | --- |
| Defoamer (Drewplus L-475) | 8.00 |
| Binder - Acrylic (50% solids - Tg 28° C.) (Rhoplex SG-10M - Rohm & Haas) | 737.08 |
| Coalescent (Texanol) | 36.85 |
| Rheology Modifier - HEUR (Acrysol - RM 8W - Rohm & Haas) | 11.62 |
| Base - Ammonia (28%) | .35 |
| Solvent - Propylene Glycol | 60.00 |
| Water | 21.26 |

The resulting prepaint had a total volume of 100 gallons, a total weight of 875.16 lbs., a volume solids of 39.00%, a weight solids of 42.11%, a density of 8.7519 lbs./gallon and 10.00% coalescent on binder solids. Its initial and equilibrated Stormer viscosities were 97 and 98. The initial and equilibrated pH values were 9.0. It's equilibrated Brookfield viscosity should be less than 10,000 cps.

Example 7

This example describes the preparation of a white pigment prepaint prepared with a solvent-free acrylic binder and without the use of a coalescent. The ingredients are mixed as described in Example 1 using the ingredients and amounts set out below.

| Ingredient | Amount (lbs./100 gallons) |
| --- | --- |
| Pigment -Titanium Dioxide (Ti-Pure R-706 - DuPont) | 734.49 |
| Opacifier - Voided Latex Particles (Ropaque ® OP-96 - Rohm & Haas) | 164.43 |
| Dispersant (Tamol 731 - Rohm & Haas) | 29.38 |
| Non-ionic Surfactant (Triton CF-10) | 2.00 |
| Biocide (Kathon LX (1.5%) - Rohm & Haas) | 2.00 |
| Defoamer (Foamaster VL) | 3.00 |
| Binder - Acrylic copolymer (43.5% solids - Tg −2° C.) (Rhoplex SF-012 - Rohm & Haas) | 165.96 |
| Rheology Modifier - HEUR (Acrysol RM-825 - Rohm & Haas) | 5.00 |
| Rheology Modifier - HEUR (Acrysol RM-2020 NPR - Rohm & Haas) | 42.69 |
| Base - Ammonia (28%) | .49 |
| Water | 250.13 |

The resulting prepaint should have a total volume of 100.00 gallons, total weight of 1,401.34 lbs., total PVC of 80.00%, volume solids of 40.00%, weight solids of 61.09% density of 14.0134 lbs./gallon, and 1.00% dispersant on pigment solids. Its estimated Stormer viscosity is 102 KU. Its pH should be 8.5–9.0.

Example 8

This example describes the preparation of an exterior pigment extender prepaint with a solvent-free acrylic binder without the use of a coalescent. The ingredients are mixed as described in Example 1 using the ingredient amounts set out below.

| Ingredient | Amount (lbs./100 gallons) |
| --- | --- |
| Pigment - Nephiline Syenite (7.5 μ) (Minex 4) | 697.16 |
| Dispersant (Tamol 731 - Rohm & Haas) | 27.89 |
| Non-ionic Surfactant (Triton CF-10) | 2.00 |
| Biocide (Kathon LX (1.5%) - Rohm & Haas) | 2.00 |
| Defoamer (Foamaster VL) | 3.00 |
| Binder - Acrylic (46.5% solids - Tg 1° C.) (Primal SF-015 Rohm & Haas) | 160.84 |
| Rheology Modifier HEUR (Acrysol RM-2020 NPR - Rohm & Haas) | 101.80 |
| Water | 284.47 |

The resulting prepaint should have a total volume of 100 gallons, a total weight of 1,280.91 lbs., total PVC of 80.00%, volume solids of 40.00%, weight solids of 60.27%, density of 12.8089 lbs./gallon, and 1.00% dispersant on pigment solids. Its Stormer viscosity should be 95 KU. Its pH should be 8.5–9.0. If not, the pH is adjusted as described in Example 7.

Example 9

This example describes the preparation of an interior pigment extender prepaint prepared with a solvent-free vinyl acetate/acrylic binder without the use of a coalescent. The ingredients are mixed as described in Example 1 using the ingredient amounts set out below.

| Ingredient | Amount (lbs./100 gallons) |
| --- | --- |
| Pigment - Calcium Carbonate (3.2 μ) (Snowflake) | 451.20 |
| Pigment - Aluminum Silicate (1.4 μ) (Optiwhite) | 220.37 |
| Dispersant (Tamol 1254 - Rohm & Haas) | 19.19 |
| Non-ionic Surfactant (Triton CF-10) | 2.00 |
| Biocide (Kathon LX (1.5%)) | 2.00 |
| Defoamer (Foamaster VL) | 3.00 |
| Binder - Vinyl Acetate/Acrylic (55% solids) (Rovace 9900) | 139.86 |
| Rheology Modifier HASE (Acrysol DR-3) | 9.00 |
| Base - Ammonia (28%) | 0.86 |
| Water | 405.69 |

The resulting prepaint should have a total volume of 100 gallons, a total weight of 1,254.91 lbs., total PVC of 80.00%, a volume solids of 40.00%, a weight solids of 59.65%, a density of 12.5489 lbs./gallon, and 1.00% dispersant on pigment solids. Its Stormer viscosity should be 95 KU. Its pH should be 8.5–9.0.

Example 10

This example describes the preparation of a vinyl acetate/acrylic binder prepaint prepared with a solvent-free vinyl acetate/acrylic binder without a coalescent. The ingredients are mixed as described in Example 4 using the ingredient amounts set out below.

| Ingredient | Amount (lbs./100 gallons) |
| --- | --- |
| Binder - Vinyl Acetate/Acrylic (55% solids - Tg 10° C.) (Rovace 9900 - Rohm & Haas) | 699.25 |
| Defoamer (Foamaster VL) | 3.00 |
| Rheology Modifier HASE (Acrysol DR-3 - Rohm & Haas) | 12.96 |
| Base - Ammonia (28%) | 2.90 |
| Water | 405.69 |

The resulting prepaint should have a total volume of 100 gallons, a total weight of 885.16 lbs., a volume solids of 40.00%, a weight solids of 43.45%, and a density of 8.8516 lbs./gallon. Its Stormer viscosity should be 99 KU. Its Brookfield viscosity should be less than 10,000 cps. Its pH should be 8.5–9.0.

Example 11

This example describes the preparation of a flat binder prepaint prepared with a solvent-free acrylic binder and no coalescent. The ingredients are mixed as described in Example 4 using the ingredient amounts set out below.

| Ingredient | Amount (lbs./100 gallons) |
| --- | --- |
| Defoamer (Foamaster VL) | 8.00 |
| Binder - Acrylic Copolymer (43.5% solids - Tg −2° C.) (Rhoplex SF-012 - Rohm & Haas) | 723.77 |
| Rheology Modifier - HEUR (Acrysol RM-2020 NPR - Rohm & Haas) | 3.00 |
| Water | 133.75 |

The resulting prepaint should have a total volume of 100 gallons, a total weight of 868.52, a volume solids of 36.00%, a weight solids of 38.75% and a density of 8.6853 lbs./gallon. Its Stormer viscosity should be 99 KU. Its Brookfield viscosity should be less than 10,000 cps. Its pH should be 8.5–9.0 and, if not, it is adjusted as discussed above.

Example 12

This example describes the preparation of a gloss binder prepaint using a solvent-free acrylic binder and no coalescent. The ingredients are mixed as described in Example 4 using the ingredient amounts set out below.

| Ingredient | Amount (lbs./100 gallons) |
| --- | --- |
| Defoamer (Foamaster VL) | 8.00 |
| Binder- Acrylic Copolymer (43.5% solids - Tg −2° C.) (Rhoplex SF-012 - Rohm & Haas) | 767.57 |
| Rheology Modifier - HEUR (Acrysol RM-2020 NPR - Rohm & Haas) | 23.00 |
| Water | 61.62 |

The resulting prepaint should have a total volume of 100.00 gallons, a total weight of 860.40 lbs., a volume solids of 37.00%, a weight solids of 38.81% and a density of 8.6040 lbs./gallon. Its Stormer viscosity should be 99 KU. Its Brookfield viscosity should be less than 10,000 cps. Its pH should be 8.5–9.0 and, if not, it should be adjusted as described above.

Example 13

This example describes the preparation of a white pigment prepaint using an interior gloss grade titanium dioxide which is prepared by combining the following ingredients:

| Ingredient | Amount (lbs./100 gallons) |
| --- | --- |
| Pigment - Titanium Dioxide (Ti-Pure R-900 - DuPont) | 734.49 |
| Opacifier - Voided Latex Particles (30.5% solids) (Ropaque ® Ultra-Rohm & Haas) | 164.43 |
| Dispersant (Tamol 1254 - Rohm & Haas) | 20.99 |
| Non-ionic Surfactant (Triton CF-10) | 2.00 |
| Biocide (Kathon LX (1.5%) - Rohm & Haas) | 2.00 |
| Defoamer (Foamaster VL - source) | 3.00 |
| Binder - Vinyl Acetate/Acrylic (55% solids - Tg 14° C.) (RES 3083 - Rohm & Haas) | 140.10 |
| Coalescent (Texanol) | 11.37 |
| Rheology Modifier)HASE (Acrysol DF3-source?) | 11.47 |
| Base - Ammonia (28%) | 1.20 |
| Solvent - Propylene Glycol | 50.00 |
| Water | 264.38 |

The resulting prepaint had a total volume of 100 gallons, a total weight of 1405.43 lbs., a total PVC of 80%, a volume solids of 40%, a weight solids of 61.25%, a density of 14.0543 lbs./gallon, 1.00% dispersant on pigment solids, and 9.00% coalescent on binder solids. The Stormer viscosity was 100 KU. The Brookfield viscosity was 15,300 cps. The pH was 8.8.

Example 14

This example describes the preparation of a white pigment prepaint using an exterior gloss grade titanium dioxide which is prepared by combining the following ingredients:

| Ingredient | Amount (lbs./100 gallons) |
| --- | --- |
| Pigment - Titanium Dioxide (Ti-Pure ® R-706-DuPont) | 734.56 |
| Opacifier - Voided Latex Particles (30.5% solids) (Ropaque ® Ultra-Rohm & Haas) | 164.44 |
| Dispersant (Tamol 731-Rohm & Haas)) | 29.38 |
| Non-ionic Surfactant (Triton CF-10) | 2.00 |
| Biocide (Kathon LX (1.5%) - Rohm & Haas) | 2.00 |
| Defoamer (Foamaster VL) | 3.00 |
| Binder - Acrylic Copolymer (50% solids - Tg 28° C.) (Rhoplex SG-10 - Rohm & Haas) | 151.20 |
| Coalescent (Texanol) | 12.49 |
| Rheology Modifier)HEUR (Acrysol RM-2020 NPR - Rohm & Haas) | 42.69 |
| Base - Ammonia (28%) | .49 |
| Solvent - Propylene Glycol | 50.00 |
| Water | 211.34 |

The resulting prepaint had a total volume of 100 gallons, a total weight of 1403.61 lbs., a total PVC of 80%, a volume solids of 40%, a weight solids of 61.23%, a density of 14.0361 lbs./gallon, 1.00% dispersant on pigment solids, and 9.00% coalescent on binder solids. The Stormer viscosity was 100 KU. The Brookfield viscosity was 4,010 cps. The pH was 8.8.

Example 15

This example describes the preparation of an exterior pigment extender prepaint. It is prepared by combining the following ingredients:

| Ingredient | Amount (lbs./100 gallons) |
|---|---|
| Pigment - Nephilene Syenite (7.5 μ) (Minex 4) | 697.16 |
| Dispersant (Tamol 731 - Rohm and Haas) | 27.89 |
| Non-ionic Surfactant (Triton CF-10) | 2.00 |
| Biocide Kathon LX (1.5%) - Rohm & Haas | 2.00 |
| Defoamer (Foamaster VL) | 3.00 |
| Binder - Acrylic (53.5% solids - Tg 18° C.) (Rhoplex Multilobe 200 - Rohm & Haas) | 139.98 |
| Coalescent (Texanol) | 5.24 |
| Rheology Modifier - HEUR (Acrysol RM-2020 - Rohm & Haas) | 101.80 |
| Solvent - Propylene Glycol | 50.00 |
| Water | 254.40 |

The resulting prepaint had a total volume of 100 gallons, a total weight of 1281.47 lbs., a total PVC of 80.00%, a volume solids of 40.00%, a weight solids of 60.25%, a density of 12.8143 lbs./gallon, 1.00% dispersant on pigment solids, and 7.00% total coalescent on binder solids. The Stormer viscosity was 96 KU. The Brookfield viscosity was 7,210 cps. The pH was 9.8.

Example 16

This example describes the preparation of an interior pigment extender prepaint. It is prepared by combining the following ingredients:

| Ingredients | Amounts (lbs./100 gallons) |
|---|---|
| Pigment - Calcium Carbonate (5 μ) (Snowflake) | 451.20 |
| Pigment - Aluminum Silicate (1.4 μ) (Optiwhite) | 220.37 |
| Dispersant (Tamol 1254 - Rohm & Haas) | 19.19 |
| Non-ionic Surfactant (Triton CF-10) | 2.00 |
| Biocide (Kalthon LX (1.5%) - Rohm & Haas) | 2.00 |
| Defoamer (Foamaster VL) | 3.00 |
| Binder - Vinyl Acetate/Acrylic (55% solids - Tg 14° C.) (RES 3083 - Rohm & Haas) | 140.10 |
| Coalescent (Texanol) | 6.93 |
| Rheology Modifier - HASE (Acrysol DR-3 - Rohm & Haas) | 11.00 |
| Base - Ammonia (28%) | 0.86 |
| Solvent - Propylene Glycol | 50.00 |
| Water | 348.48 |

The resulting prepaint had a total volume of 100 gallons, a total weight of 1255.13 lbs., a total PVC of 80.00%, a volume solids of 40.00%, a weight solids of 59.65%, a density of 12.5512 lbs./gallon, 1.00% dispersant on pigment solids, and 9.00% total coalescent on binder solids. The Stormer viscosity was 102 KU. The Brookfield viscosity was 3,410 cps. The pH was 8.9.

Example 17

This describes the preparation of a vinyl acetate/acrylic binder prepaint. It is prepared by combining the following ingredients:

| Ingredients | Amounts (lbs./100 gallons) |
|---|---|
| Defoamer (Foamaster VL) | 3.00 |
| Binder - Vinyl Acetate/Acrylic (55% solids - Tg 14° C.) (RES 3083 - Rohm & Haas) | 700.48 |
| Coalescent (Texanol) | 34.67 |
| Rheology Modifier - HASE (Acrysol DR-3 - Rohm & Haas) | 12.96 |
| Base - Ammonia (28%) | 2.90 |
| Solvent - Propylene Glycol | 50.00 |
| Water | 83.48 |

The resulting prepaint had a total volume of 100 gallons, a total weight of 887.49 lbs., a volume solids of 40.00%, a weight solids of 43.41%, a density of 8.8750 lbs./gallon, 9.00% coalescent on binder solids. Its Stormer viscosity was 98.0. The Brookfield viscosity was 13,600 cps. Its pH was 9.0.

Example 18

This example describes the preparation of a flat acrylic binder prepaint. It is prepared by combining the following ingredients:

| Ingredients | Amounts (lbs./100 gallons) |
|---|---|
| Defoamer (Foamaster VL) | 3.00 |
| Binder - Acrylic (53.5% solids - Tg 18° C.) (Rhoplex Multilobe 200 - Rohm & Haas?) | 699.92 |
| Coalescent (Texanol) | 26.21 |
| Rheology Modifier - HEUR (Acrysol RM-2020 NPR - Rohm & Haas) | 1.44 |
| Base - Ammonia (28%) | 0.35 |
| Solvent - Propylene Glycol | 50.00 |
| Water | 96.59 |

The resulting prepaint had a total volume of 100 gallons, a total weight of 877.51 lbs., a volume solids of 40.00%, a weight solids of 42.67%, a density of 8.7751 lbs./gallon, 7.00% coalescent on binder solids. Its Stormer viscosity was 94.0. The Brookfield viscosity was 4,900 cps. Its pH was 8.9.

Example 19

This example describes the preparation of a gloss acrylic binder prepaint. It is prepared by combining the following ingredients:

| Ingredients | Amounts (lbs./100 gallons) |
| --- | --- |
| Defoamer (Foamaster VL) | 3.00 |
| Binder - Acrylic Copolymer (50% solids - Tg 28° C.) (Rhoplex SG-10M - Rohm & Haas) | 755.99 |
| Coalescent (Texanol) | 37.80 |
| Rheology Modifier - HEUR (Acrysol RM-2020 NPR - Rohm & Haas) | 11.62 |
| Base - Ammonia (28%) | 0.35 |
| Solvent - Propylene Glycol | 50.00 |
| Water | 17.68 |

The resulting prepaint had a total volume of 100 gallons, a total weight of 876.44 lbs., a volume solids of 40.00%, a weight solids of 43.13%, a density of 8.7644 lbs./gallon, 10.00% coalescent on binder solids. Its Stormer viscosity was 96. The Brookfield viscosity was 5,000 cps. Its pH was 8.8.

Example 20

This example describes the preparation of a white prepaint by combining the following ingredients:

| Ingredient | Amount (lbs./100 gallons) |
| --- | --- |
| Pigment - Titanium Dioxide (Ti-Pure R-706 - DuPont) | 1001.66 |
| Dispersant (Tamol 1124 - Rohm & Haas) | 20.03 |
| Defoamer (Drewplus L-475) | 1.00 |
| Binder Acrylic (50% solids - Tg 28° C. (Rhoplex SG - 10M - Rohm & Haas) | 189.00 |
| Opacifer - Voided Latex Particles (Ropaque ® OP-96 - Rohm & Haas) | 172.50 |
| Coalescent (Texanol) | 14.72 |
| Rheology Modifier (Acrysol RM-8W - Rohm & Haas) | 2.00 |
| Base - Ammonia (28%) | 1.65 |
| Water 200.44 | 200.44 |

The resulting prepaint should have a total volume of 100 gallons, a total weight of 1,602.99 lbs., a total PVC of 80.00%, a volume solids of 50.00%, a weight solids of 71.66%, a density of 16.03 lbs./gallon, 1% dispersant on pigment solids, and 10.00% coalescent on latex solids.

Example 21

This example describes the preparation of an exterior pigment extender by combining the following ingredients:

| Ingredient | Amount (lbs./100 gallons) |
| --- | --- |
| Pigment - Nephelene Syenite (7.5 µ) (Minex 4) | 871.44 |
| Dispersant (Tamol 1124 - Rohm & Haas) | 8.71 |
| Defoamer | 2.00 |

-continued

| Ingredient | Amount (lbs./100 gallons) |
| --- | --- |
| (Drewplus L-475) | |
| Binder Acrylic (60.5% solids - Tg 16° C.) (Rhoplex AC-264 - Rohm & Haas) | 154.74 |
| Coalescent (Texanol) | 6.56 |
| Rheology Modifier (Acrysol RM-8W - Rohm & Haas) | 3.00 |
| Water | 326.08 |

The resulting prepaint should have a total volume of 100 gallons, a total weight of 1,382.53 lbs., a total PVC of 80.00%, a volume solids of 50.00%, a weight solids of 69.80%, a density of 13.82 lbs./gallon, 0.5% dispersant on pigment solids, and 7.00% coalescent on latex solids.

Example 22

This example describes the preparation of an interior pigment extender prepaint by combining the following ingredients:

| Ingredient | Amount (lbs./100 gallons) |
| --- | --- |
| Pigment - Calcium Carbonate (12 µ) (Omyacarb 12) | 450.67 |
| Pigment - Calcium Carbonate (3.2 µ) (Vicron 15-15) | 226.17 |
| Pigment - Aluminum Silicate (1.4 µ) (Optiwhite) | 183.76 |
| Dispersant (Tamol 1124 - Rohm & Haas) | 8.61 |
| Defoamer (Drewplus L-475) | 1.00 |
| Binder - Vinyl Acetate/Acrylic (55% solids - Tg 14° C.) (RES 3803) | 175.09 |
| Coalescent (Texanol) | 6.74 |
| Rheology Modifier - HEUR (Acrysol SCT-275) | 15.00 |
| Base - Ammonia (28%) | 0.87 |
| Water | 308.13 |

The resulting prepaint should have a total volume of 100 gallons, a total weight of 1376.04 lbs., a total PVC of 80.00%, a volume solids of 50.00%, a weight solids of 69.54%, a density of 13.76 lbs./gallon, 0.5% dispersant on pigment solids, and 7.00% coalescent on latex solids.

Example 23

This example describes the preparation of a vinyl acetate/acrylic binder prepaint by combining the following ingredients:

| Ingredient | Amount (lbs./100 gallons) |
| --- | --- |
| Defoamer (Drewplus L-475) | 2.00 |
| Binder - Vinyl Acetate/Acrylic (55% solids - Tg 14° C.) (RES 3803) | 875.62 |
| Coalescent (Texanol) | 13.00 |

-continued

| Ingredient | Amount (lbs./100 gallons) |
|---|---|
| Rheology Modifier -HEUR (Acrysol SCT-275 - Rohm & Haas) | 9.29 |

The resulting prepaint should have a total volume of 100 gallons, a total weight of 899.91 lbs., a total PVC of 0.00%, a volume solids of 50.00%, a weight solids of 53.52%, a density of 8.99 lbs./gallon, and 10.00% coalescent on latex solids.

Example 24

This example describes the preparation of a flat acrylic prepaint by combining the following ingredients:

| Ingredient | Amount (lbs./100 gallons) |
|---|---|
| Defoamer (Drewplus L-475) | 8.00 |
| Binder Acrylic (60.5% solids - Tg 16° C.) (Rhoplex AC-264 - Rohm & Haas) | 773.67 |
| Coalescent (Texanol) | 23.40 |
| Rheology Modifier (HEUR) (Acrysol RM-8W - Rohm & Haas) | 13 |
| Base - Ammonia (28%) | 0.50 |
| Solvent - Propylene Glycol | 60.00 |
| Water | 1.84 |

The resulting prepaint should have a total volume of 100 gallons, a total weight of 880.41 lbs., a total PVC of 0.00%, a volume solids of 50.00%, a weight solids of 53.17%, a density of 8.80 lbs./gallon, and 5.00% coalescent on latex solids.

Example 25

This example describes the preparation of a gloss acrylic binder by combining the following ingredients:

| Ingredient | Amount (lbs./100 gallons) |
|---|---|
| Binder - Acrylic (50% solids - Tg 28° C.) (Rhoplex SG-10M - Rohm & Haas) | 836.85 |
| Coalescent (Texanol) | 41.84 |

The resulting prepaint should have a total volume of 100 gallons, a total weight of 878.7 lbs., a total PVC of 0.00%, a volume solids of 44.28%, a weight solids of 47.42%, a density of 8.78 lbs./gallon, and 10.00% coalescent on latex solids.

Example 26

This example describes the preparation of nine exterior flat latex paints of varying quality and tone using different combinations of the white pigment prepaint of Example 14, the exterior pigment extender prepaint of Example 15, the vinyl acetate-acrylic (PVA) binder prepaint of Example 17, and the flat acrylic binder prepaint of Example 18. The paints are formulated by adding the white pigment prepaint and exterior pigment extender prepaint to the binder prepaints and mixing well.

| Paint | | | Prepaints (wt.) | | | | |
|---|---|---|---|---|---|---|---|
| | | | | | | Flat | |
| No. | PVC (%) | Volume Solids (%) | White (Ex 14) | Exterior Extender (Ex 15) | PVA Binder (Ex 17) | Acrylic Binder (Ex 18) | Water (wt.) |
| 26-1 | 45.0 | 35.0 | 395.53 | 269.60 | — | 335.92 | 104.34 |
| 26-2 | 50.0 | 30.0 | 317.19 | 311.10 | — | 246.80 | 208.68 |
| 26-3 | 50.0 | 30.0 | 263.69 | 359.94 | 197.64 | 51.38 | 208.68 |
| 26-4 | 42.5 | 35.0 | 197.77 | 415.12 | — | 359.92 | 104.34 |
| 26-5 | 47.5 | 30.0 | 158.60 | 425.86 | — | 267.37 | 208.68 |
| 26-6 | 47.5 | 30.0 | 131.84 | 450.28 | 214.11 | 55.67 | 208.68 |
| 26-7 | 40.0 | 35.0 | — | 560.64 | — | 383.91 | 104.34 |
| 26-8 | 45.0 | 30.0 | — | 540.62 | — | 287.93 | 208.68 |
| 26-9 | 45.0 | 30.0 | — | 540.62 | 230.58 | 59.95 | 208.68 |

Paints 26-1, 26-4 and 26-7 are premium quality light, mid and deep tone paints; paints 26-2, 26-5 and 26-8 are first quality light, mid and deep tone paints; and paints 26-3, 26-6 and 26-9 are second quality light, mid and deep tone paints.

Example 27

This example describes the preparation of nine exterior satin latex paints of varying quality and tone using different combinations of the white pigment prepaint and exterior pigment extender prepaint of Examples 14 and 15, respectively, and the vinyl acetate/acrylic binder (PVA) and flat acrylic binder prepaints of Examples 17 and 18. The paints are formulated as described above.

| Paint | | | Prepaints (wt.) | | | | |
|---|---|---|---|---|---|---|---|
| | | | | | | Flat | |
| No. | PVC (%) | Volume Solids (%) | White (Ex 14) | Exterior Extender (Ex 15) | PVA Binder (Ex 17) | Acrylic Binder (Ex 18) | Water (wt.) |
| 27-1 | 35.0 | 35.0 | 395.53 | 129.44 | — | 431.90 | 104.34 |
| 27-2 | 37.0 | 30.0 | 351.59 | 123.51 | — | 353.75 | 208.68 |
| 27-3 | 40.0 | 26.0 | 263.69 | 175.73 | 228.35 | 59.41 | 292.15 |
| 27-4 | 32.5 | 36.0 | 197.77 | 287.98 | — | 468.92 | 83.47 |
| 27-5 | 34.5 | 30.0 | 175.75 | 253.98 | — | 374.31 | 208.68 |
| 27-6 | 37.5 | 26.0 | 131.84 | 270.07 | 242.63 | 63.12 | 292.12 |
| 27-7 | 30.0 | 36.0 | — | 432.50 | — | 493.60 | 83.47 |
| 27-8 | 32.0 | 30.0 | — | 384.44 | — | 394.88 | 208.68 |
| 27-9 | 35.0 | 26.0 | — | 364.42 | 256.87 | 66.86 | 292.15 |

Paints 27-1, 27-4 and 27-7 are premium quality light, mid and deep tone paints; paints 27-2, 27-5 and 27-8 are first quality light, mid and deep tone paints; and paints 27-3, 27-6 and 27-9 are second quality light, mid and deep tone paints.

Example 28

This example describes the preparation of nine exterior gloss latex paints of using different combinations of the white pigment and exterior extender prepaints of Examples 14 and 15 and vinyl acetate/acrylic binder (PVA) and gloss acrylic binder prepaints of Examples 17 and 19. The paints are formulated as described above.

| | Paint | | Prepaints (wt.) | | | |
|---|---|---|---|---|---|---|
| | | Volume | | PVA | Gloss Acrylic | |
| No. | PVC (%) | Solids (%) | White (Ex 14) | Binder (Ex 17) | Binder (Ex 19) | Water (wt.) |
| 28-1 | 26.0 | 35.0 | 435.66 | — | 494.85 | 104.34 |
| 28-2 | 30.0 | 30.0 | 460.50 | — | 413.60 | 166.94 |
| 28-3 | 30.0 | 30.0 | 429.93 | 304.15 | 88.51 | 208.68 |
| 28-4 | 13.0 | 35.0 | 217.83 | — | 630.87 | 104.34 |
| 28-5 | 15.0 | 30.0 | 230.25 | — | 557.38 | 166.94 |
| 28-6 | 15.0 | 30.0 | 214.96 | 409.14 | 119.06 | 208.68 |
| 28-7 | — | 35.0 | — | — | 766.89 | 104.34 |
| 28-8 | — | 30.0 | — | — | 701.15 | 166.94 |
| 28-9 | — | 30.0 | — | 514.12 | 149.61 | 208.68 |

Paints 28-1, 28-4 and 28-7 are premium quality light, mid and deep tone paints; paints 28-2, 28-5 and 28-8 are first quality light, mid and deep tone paints; and paints 28-3, 28-6 and 28-9 are second quality light, mid and deep tone paints.

Example 29

This example describes the preparation of nine interior flat latex paints using different combinations of the white pigment and interior extender prepaints of Examples 14 and 16 and the vinyl acetate/acrylic (PVA) and flat acrylic binder prepaints of Examples 17 and 18. The paints are formulated as described above.

| | Paint | | Prepaints (wt.) | | | | |
|---|---|---|---|---|---|---|---|
| | | Volume | | Interior | PVA | Flat Acrylic | |
| No. | PVC (%) | Solids (%) | White (Ex 14) | Extender (Ex 16) | Binder (Ex 17) | Binder (Ex 18) | Water (wt.) |
| 29-1 | 50.0 | 30.0 | 351.59 | 273.94 | 197.64 | 51.38 | 208.68 |
| 29-2 | 60.0 | 30.0 | 263.69 | 470.21 | 166.40 | — | 208.68 |
| 29-3 | 75.0 | 25.0 | 620.95 | 34.67 | — | — | 313.02 |
| 29-4 | 47.5 | 15.0 | 175.79 | 401.73 | 214.11 | 55.67 | 208.68 |
| 29-5 | 57.5 | 30.0 | 131.84 | 558.69 | 187.20 | — | 208.68 |
| 29-6 | 72.5 | 25.0 | 64.01 | 653.67 | 52.00 | — | 313.02 |
| 29-7 | 45.0 | 30.0 | — | 529.51 | 230.58 | 59.95 | 208.68 |
| 29-8 | 55.0 | 30.0 | — | 647.18 | 208.01 | — | 208.68 |
| 29-9 | 70.0 | 25.0 | — | 686.40 | 69.34 | — | 313.02 |

Paints 29-1, 29-4 and 29-7 are premium quality light, mid and deep tone paints; paints 29-2, 29-5 and 29-8 are first quality light, mid and deep tone paints; and paints 29-3, 29-6 and 29-9 are second quality light, mid and deep tone paints.

Example 30

This example describes the preparation of nine interior satin latex paints using the white pigment and interior extender prepaints of Examples 14 and 16 and the vinyl acetate/acrylic (PVA) and flat acrylic binder prepaints of Examples 17 and 18. The paints are formulated as described above.

| | Paint | | Prepaints (wt.) | | | | |
|---|---|---|---|---|---|---|---|
| | | Volume | | Interior | PVA | Flat Acrylic | |
| No. | PVC (%) | Solids (%) | White (Ex 14) | Extender (Ex 16) | Binder (Ex 17) | Binder (Ex 18) | Water (wt.) |
| 30-1 | 35.0 | 36.0 | 395.53 | 140.51 | 355.75 | 92.49 | 83.47 |
| 30-2 | 37.0 | 30.0 | 351.59 | 120.98 | 357.77 | — | 208.68 |
| 30-3 | 40.0 | 20.0 | 263.69 | 172.12 | 288.43 | — | 292.15 |
| 30-4 | 32.5 | 36.0 | 197.77 | 282.06 | 375.51 | 97.96 | 83.47 |
| 30-5 | 34.5 | 30.0 | 175.79 | 248.76 | 378.57 | — | 208.68 |
| 30-6 | 37.5 | 26.0 | 131.84 | 264.52 | 306.46 | — | 292.15 |
| 30-7 | 30.0 | 36.0 | — | 423.61 | 395.28 | 102.77 | 83.47 |
| 30-8 | 32.0 | 30.0 | — | 376.54 | 399.37 | — | 208.68 |
| 30-9 | 35.0 | 26.0 | — | 356.93 | 324.49 | — | 292.15 |

Paints 30-1, 30-4 and 30-7 are premium quality light, mid and deep tone paints; paints 30-2, 30-5 and 30-8 are first quality light, mid and deep tone paints; and paints 30-3, 30-6 and 30-9 are second quality light, mid and deep tone paints.

Example 31

This example describes the preparation of nine interior gloss latex paints using the white pigment prepaint of Example 14 and the vinyl acetate/acrylic (PVA) and gloss acrylic binder prepaints of Examples 17 and 19. The paints are formulated as described above.

| | Paint | | Prepaints (wt.) | | | |
|---|---|---|---|---|---|---|
| | | Volume | | PVA | Gloss Acrylic | |
| No. | PVC (%) | Solids (%) | White (Ex 14) | Binder (Ex 17) | Binder (Ex 19) | Water (wt.) |
| 31-1 | 26.0 | 35.0 | 435.66 | — | 494.85 | 104.34 |
| 31-2 | 30.0 | 38.0 | 429.93 | 304.15 | 88.51 | 208.68 |
| 31-3 | 30.1 | 28.0 | 403.18 | 366.31 | — | 250.42 |
| 31-4 | 13.0 | 35.0 | 217.83 | — | 630.87 | 104.34 |
| 31-5 | 15.0 | 30.0 | 214.96 | 409.14 | 119.06 | 208.68 |
| 31-6 | 15.0 | 28.0 | 201.59 | 493.78 | — | 250.42 |
| 31-7 | — | 35.0 | — | — | 766.89 | 104.34 |
| 31-8 | — | 30.0 | — | 514.12 | 149.61 | 208.68 |
| 31-9 | — | 28.0 | — | 621.24 | — | 250.42 |

Paints 31-1, 31-4 and 31-7 are premium quality light, mid and deep tone paints; paints 31-2, 31-5 and 31-8 are first quality light, mid and deep tone paints; and paints 31-3, 31-6 and 31-9 are second quality light, mid and deep tone paints.

Example 32

This example describes the preparation of a latex paint useful for architectural coatings which can be prepared using the white prepaint of Example 20, the exterior pigment extender of Example 21, and the flat acrylic binder prepaint of Example 24. The paint is formulated as described above.

|  | | Prepaints (wt.) | | |
|---|---|---|---|---|
| Paint | | | Flat | |
| PVC (%) | Volume Solids (%) | White (Ex 20) | Exterior Extender (Ex 21) | Acrylic Binder (Ex 24) | Water (wt.) |
| 35 | 48 | 331.27 | 294.95 | 475.42 | 33.39 |

The resulting paint should be a premium paint having a satin finish and a light tone.

Example 33

This example describes the preparation of a low solids interior flat paint using the white pigment prepaint of Example 20, the interior pigment extender of Example 22, and the vinyl acetate/acrylic (PVA) binder prepaint of Example 23.

| Paint | | Prepaints (wt.) | | | |
|---|---|---|---|---|---|
| PVC (%) | Volume Solids (%) | White (Ex 20) | Interior Extender (Ex 22) | PVA Binder (Ex 23) | Water (wt.) |
| 75 | 15 | 107.22 | 294.97 | 16.87 | 584.31 |

Example 34

This example describes the preparation of paints using the prepaints of Examples 1 to 6. The paints were prepared by mixing the pigment prepaint(s) with the binder prepaint(s), then adding the thickners, water and colorants and mixing well. The Stormer viscosity, ICI viscosity, and pH were the equilibrated measured values.

Part A—Exterior Flat Paints (Best and Good)

| | Prepaint (lbs.) | | | | Thickener (lbs.) | | | |
|---|---|---|---|---|---|---|---|---|
| Paint No. | White Pigment (Ex 1) | Exterior Extender Pigment (Ex 2) | PVA Binder (Ex 4) | Flat Acrylic Binder (Ex 6) | Acrysol SCT-275 | Acrysol RM 2020 NPR | Water (lbs.) | Colorant (lbs.) |
| 34-1[a] | 353.86 | 278.01 | — | 306.97 | 10.40 | 14.00 | 149.68 | — |
| 34-2[b] | 235.96 | 351.50 | 177.30 | 46.09 | 26.40 | 11.20 | 237.06 | — |
| 34-3[a] | — | 516.00 | — | 351.00 | 32.68 | — | 146.45 | 162 |
| 34-4[b] | — | 500.00 | 206.58 | 53.70 | 48.48 | — | 237.06 | 162 |

[a]Best light tone and deep tone paints
[b]Good light tone and deep tone paints

| | Measured Equilibrated Values | | | Calculated Properties | | | | | |
|---|---|---|---|---|---|---|---|---|---|
| Paint No. | Stormer Viscosity (KU) | ICI Viscosity (cp) | pH | Volume[A] (gallons) | Weight* (lbs) | PVC (%) | Volume Solids (%) | Weight Solids (%) | Density (lb/gal) |
| 34-1[c] | 102 | 1.15 | 8.76 | 100 | 1112.92 | 45.05 | 35.08 | 50.66 | 11.13 |
| 34-2[d] | 101 | 0.87 | 8.30 | 100 | 1085.52 | 50.04 | 30.05 | 45.68 | 10.86 |
| 34-3[e] | 110 | 1.90 | 9.02 | 100 | 1046.13 | 39.94 | 35.00 | 47.92 | 10.46 |
| 34-4[f] | 121 | 1.80 | 8.70 | 100 | 1045.82 | 45.09 | 29.76 | 43.25 | 10.36 |

[c]There was 0.44% dispersant based on dry pigment and 7.48% coalescent based on dry polymer.
[d]There was 0.46% dispersant based on dry pigment and 7.40% coalescent based on dry polymer.
[e]There was 0.50% dispersant based on dry pigment and 7.00% coalescent based on dry polymer.
[f]There was 0.50% dispersant based on dry pigment and 7.00% coalescent based on dry polymer.

Part B—Exterior Satin Paint (Better)

| Paint No. | Prepaint (lbs.) ||||| Thickener (lbs.) || Water (lbs.) | Colorant (lbs.) |
|---|---|---|---|---|---|---|---|---|
| | White Pigment (Ex 1) | Exterior Extender Pigment (Ex 2) | PVA Binder (Ex 4) | Flat Acrylic Binder (Ex 6) | Acrysol SCT-275 | Acrysol RM 2020 NPR | | |
| 34-5 | 314.56 | 137.00 | — | 323.00 | 17.82 | 17.58 | 234.22 | — |

| Paint No. | Measured Equilibrated Values ||| Calculated Properties |||||
|---|---|---|---|---|---|---|---|---|
| | Stormer Viscosity (KU) | ICI Viscosity (cp) | pH | Volume (gallons) | Weight (lbs) | PVC (%) | Volume Solids (%) | Weight Solids (%) | Density (b/gal) |
| 34-5 | 104 | 1.19 | 8.95 | 100.00 | 1044.18 | 36.94 | 29.96 | 43.26 | 10.44 |

There was 0.43% dispersant based on dry pigment and 7.43% coalescent based on dry polymer.

Part C—Exterior Semigloss (Best and Good)

| Paint No. | Prepaint (lbs.) ||||| Thickener (lbs.) || Water (lbs.) | Colorant (lbs.) |
|---|---|---|---|---|---|---|---|---|
| | White Pigment (Ex 1) | Exterior Extender Pigment (Ex 2) | PVA Binder (Ex 4) | Gloss Acrylic Binder (Ex 5) | Acrysol SCT-275 | Acrysol RM 2020 NPR | | |
| 34-6[a] | 389.40 | — | — | 530.37 | — | 15.20 | 98.44 | — |
| 34-7[b] | 383.98 | — | 85.33 | 294.89 | 22.40 | 26.00 | 217.67 | — |

[a]Best
[b]Good

| Paint No. | Measured Equilibrated Values ||| Calculated Properties |||||
|---|---|---|---|---|---|---|---|---|
| | Stormer Viscosity (KU) | ICI Viscosity (cp) | pH | Volume (gallons) | Weight (lbs) | PVC (%) | Volume Solids (%) | Weight Solids (%) | Density (b/gal) |
| 34-6[c] | 99 | 1.19 | 8.54 | 100.00 | 1033.41 | 26.00 | 35.00 | 46.91 | 10.33 |
| 34-7[d] | 102 | 1.05 | 8.20 | 100.00 | 1030.27 | 30.00 | 29.90 | 42.43 | 10.30 |

[c]There was a 0.40% dispersant based on dry pigment solids and a 10.00% coalescent base on dry polymer
[d]There was a 0.40% dispersant based on dry pigment solids and a 7.97% coalescent base on dry polymer Part D—Interior Flat

| | Prepaint (lbs.) | | | | Thickener (lbs.) | | | |
|---|---|---|---|---|---|---|---|---|
| Paint No. | White Pigment (Ex 1) | Interior Extender Pigment (Ex 3) | PVA Binder (Ex 4) | Flat Acrylic Binder (Ex 5) | Acrysol SCT-275 | Acrysol RM 2020 NPR | Water (lbs.) | Colorant (lbs.) |
| 34-8[a] | 314.56 | 280.69 | 177.31 | 46.09 | 24.00 | 20.80 | 230.22 | — |
| 34-9 | 115.95 | 590.05 | 30.04 | — | 34.60 | — | 336.19 | — |
| 34-10[a] | — | 496.07 | 206.55 | 53.67 | 41.92 | — | 236.60 | 162 |
| 34-11 | — | 643.99 | 62.04 | — | 51.36 | — | 320.17 | 162 |

[a]Paints 34-8 and 34-10 were best light and deep tone paints.
Paints 34-9 and 34-11 were good light and deep tone paints.

| | Measured Equilibrated Values | | | Calculated Properties | | | | | |
|---|---|---|---|---|---|---|---|---|---|
| Paint No. | Stormer Viscosity (KU) | ICI Viscosity (cp) | pH | Volume (gallons) | Weight (lbs) | PVC (%) | Volume Solids (%) | Weight Solids (%) | Density (b/gal) |
| 34-8 | 99 | 1.05 | 8.45 | 100.00 | 1093.67 | 50.00 | 30.00 | 45.88 | 10.94 |
| 34-9 | 84 | 0.70 | 8.50 | 100.00 | 1106.83 | 75.15 | 24.99 | 43.08 | 11.07 |
| 34-10 | 120 | 1.90 | 8.60 | 100.00 | 1034.81 | 45.04 | 29.99 | 43.36 | 10.35 |
| 34-11 | 108 | 1.88 | 8.80 | 100.00 | 1077.56 | 70.00 | 25.05 | 41.74 | 10.78 |

The percentage dispersant on dry pigment was 0.45%, 0.48%, 0.50%, and 0.50% for paint nos. 34-8 to 34-11, respectively. The percentages of Coalescent was 7.53%, 47%, 7.00% and 7.00% for paint nos. 34-8 to 34-11, respectively.

Part E—Interior Satin Paint

| | Prepaint (lbs.) | | | | Thickener (lbs.) | | | |
|---|---|---|---|---|---|---|---|---|
| Paint No. | White Pigment (Ex 1) | Interior Extender Pigment (Ex 3) | PVA Binder (Ex 4) | Flat Acrylic Binder (Ex 5) | Acrysol SCT-275 | Acrysol RM 2020 NPR | Water (lbs.) | Colorant (lbs.) |
| 34-12 | 314.56 | 138.00 | 319.00 | — | 24.96 | 21.40 | 229.76 | — |

The paint was a better light tone paint.

| | Measured Equilibrated Values | | | Calculated Properties | | | | | |
|---|---|---|---|---|---|---|---|---|---|
| Paint No. | Stormer Viscosity (KU) | ICI Viscosity (cp) | pH | Volume (gallons) | Weight (lbs) | PVC (%) | Volume Solids (%) | Weight Solids (%) | Density (b/gal) |
| 34-12 | 93 | 0.91 | 8.37 | 100.00 | 1047.68 | 37.05 | 29.99 | 43.54 | 10.48 |

The dispersant in dry pigment was 0.43%.
The coalescent in dry polymer was 7.42%.

Part F—Semi-Gloss Paint

|  | Prepaint (lbs.) | | | | Thickener (lbs.) | | | |
|---|---|---|---|---|---|---|---|---|
| Paint No. | White Pigment (Ex 1) | Interior Extender Pigment (Ex 3) | PVA Binder (Ex 4) | Gloss Acrylic Binder (Ex 6) | Acrysol SCT-275 | Acrysol RM 2020 NPR | Water (lbs.) | Colorant (lbs.) |
| 34-13 | 383.98 | — | 294.89 | 85.33 | 22.40 | 26.00 | 217.67 | — |
| 34-14 | 359.89 | — | 347.58 | — | 28.80 | 28.00 | 255.70 | — |

Paint nos. 34-13 were better and good light tone paints.

| | Measured Equilibrated Values | | | Calculated Properties | | | | | |
|---|---|---|---|---|---|---|---|---|---|
| Paint No. | Stormer Viscosity (KU) | ICI Viscosity (cp) | pH | Volume (gallons) | Weight (lbs) | PVC (%) | Volume Solids (%) | Weight Solids (%) | Density (lb/gal) |
| 34-13 | 102 | 1.05 | 8.20 | 100.00 | 1030.27 | 30.01 | 29.91 | 42.43 | 10.30 |
| 34-14 | 101 | 1.19 | 7.90 | 100.00 | 1019.97 | 30.02 | 28.02 | 40.22 | 10.20 |

The dispersant was 0.40% on dry pigment for paints 34-13 and 34-14.

The coalescents were 7.97% and 7.47%, respectively for paints 34-13 and 34-14.

| Supplier Information | | |
|---|---|---|
| Material Name | Material Type | Supplier |
| Tamol 1124 | Dispersant | Rohm and Haas Company (Philadelphia, PA) |
| Tamol 1254 | Dispersant | Rohm and Haas Company (Philadelphia, PA) |
| Tamol 731 | Dispersant | Rohm and Haas Company (Philadelphia, PA) |
| Acrysol DR-3 | Thickener/Rheology Modifier | Rohm and Haas Company (Philadelphia, PA) |
| Acrysol RM-2020 NPR | Thickener/Rheology Modifier | Rohm and Haas Company (Philadelphia, PA) |
| Acrysol RM-8W | Thickener/Rheology Modifier | Rohm and Haas Company (Philadelphia, PA) |
| Acrysol RM-825 | Thickener/Rheology Modifier | Rohm and Haas Company (Philadelphia, PA) |
| Rhoplex Multilobe 200 | Binder | Rohm and Haas Company (Philadelphia, PA) |
| Rhoplex SG-10M | Binder | Rohm and Haas Company (Philadelphia, PA) |
| RES 3083 | Binder | Rohm and Haas Company (Philadelphia, PA) |
| Kathon LX 1.5% | Biocide | Rohm and Haas Company (Philadelphia, PA) |
| Triton CF-10 | Surfactant | Union Carbide Corporation (Danbury, CT) |
| Foamaster VL | Defoamer | Henkel Corporation |
| Drewplus L-475 | Defoamer | Drew Chemical Corporation |
| Ti-Pure R-746 | Titanium Dioxide Slurry | E. I. Dupont de Nemours and Co., Inc. (Wilmington, DE) |
| Ti-Pure R-706 | Titanium Dioxide | E. I. Dupont de Nemours and Co., Inc. (Wilmington, DE) |
| Ti-Pure R-900 | Titanium Dioxide | E. I. Dupont de Nemours and Co., Inc. (Wilmington, DE) |
| Ti-Pure R-902 | Titanium Dioxide | E. I. Dupont de Nemours and Co., Inc. (Wilmington, DE) |
| Minex 4 | Extender | Indusmin, Inc. |
| Optiwhite | Extender | Burgess Pigment Company |

-continued

Supplier Information

| Material Name | Material Type | Supplier |
| --- | --- | --- |
| Snowflake | Extender | ECC America, Inc. |
| Vicron 15-15 | Extender | Pfizer |
| Omyacarb | Extender | Omya |
| Texanol | Coalescent | Eastman Chemical |

The invention may include data storage and processing devices implemented in digital electronic circuitry, or in computer hardware, firmware, software, or in combinations of them. Aspects of the invention may advantageously be implemented in one or more computer programs that are executable on a programmable system including at least one programmable processor. Suitable processors include, by way of example, both general and special purpose microprocessors. Computers and databases used in the invention can use a variety of data storage devices to store programs, paint formulation information, and other data. These devices include, by way of example, semiconductor memory devices, such as RAM, ROM, EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for manufacturing a line of paint products from a limited set of prepaints comprising:
   providing a set of different but mutually compatible prepaints, sufficient to form at least one paint line, which set comprises:
   (1) at least one fluid white opacifying pigment prepaint,
   (2) at least one fluid extender pigment prepaint that has a pigment volume concentration of from about 40 to 100%, and a volume solids of from about 35 to about 65%, and
   (3) at least one fluid polymeric binder prepaint;
   receiving each of said fluid prepaints at one of several inputs of a fluid component mixing system;
   mixing said fluid prepaints in said mixing system to prepare a first base paint,
   wherein said prepaints are mixed according to a first prepaint ratio;
   collecting said first base paint at an output of said mixing system;
   mixing said fluid prepaints in said mixing system to prepare a second base paint;
   wherein said prepaints are mixed according to a second prepaint ratio;
   collecting said second base paint at an output of said mixing system;
   wherein said first prepaint ratio and said second prepaint ratio are determined at a computer system; and
   wherein said first prepaint ratio is different from said second prepaint ratio.

2. The method of claim 1 wherein at least one of said first base paint and said second base paint further comprises an associative thickener.

3. A method for manufacturing a line of paint products from a limited set of prepaints comprising:
   providing a set of different but mutually compatible prepaints, sufficient to form at least one paint line, which set comprises:
   (1) at least one fluid white-opacifying pigment prepaint,
   (2) at least one fluid extender pigment prepaint that has a PVC of from about 40 to 100% and volume solids of from about 35 to about 65%,
   (3) at least one fluid polymeric binder prepaint, and
   (4) at least one additional, different fluid prepaint selected from the group consisting of said fluid white-opacifying pigment prepaint, said fluid extender pigment prepaint, and said fluid polymeric binder prepaint;
   receiving each of said fluid prepaints at one of several inputs of a fluid component mixing system;
   mixing said fluid prepaints in said mixing system to prepare a first base paint,
   wherein said prepaints are mixed according to a first prepaint ratio;
   collecting said first base paint at an output of said mixing system;
   mixing said fluid prepaints in said mixing system to prepare a second base paint;
   wherein said prepaints are mixed according to a second prepaint ratio;
   collecting said second base paint at an output of said mixing system;
   wherein said first prepaint ratio and said second prepaint ratio are determined at a computer system; and
   wherein said first prepaint ratio is different from said second prepaint ratio.

4. The method of claim 3 wherein at least one of said first base paint and said second base paint further comprises an associative thickener.

* * * * *

INTER PARTES REEXAMINATION CERTIFICATE (0304th)
United States Patent
Friel et al.

(10) Number: US 7,250,464 C1
(45) Certificate Issued: Sep. 20, 2011

(54) DISTRIBUTED PAINT MANUFACTURING SYSTEM

(75) Inventors: John Michael Friel, Warminster, PA (US); John William Hook, III, Warminster, PA (US); Jerry William Washel, Harleysville, PA (US); Bernhard Helmut Lieser, San Pedro, CA (US)

(73) Assignee: Rohm and Haas Company, Philadelphia, PA (US)

Reexamination Request:
No. 95/001,027, Apr. 28, 2008

Reexamination Certificate for:
Patent No.: 7,250,464
Issued: Jul. 31, 2007
Appl. No.: 09/766,435
Filed: Jan. 19, 2001

(51) Int. Cl.
*C08K 3/22* (2006.01)
*B01F 13/10* (2006.01)
*B44D 2/00* (2006.01)
*B44D 3/00* (2006.01)
*B44D 3/08* (2006.01)
*C09D 7/12* (2006.01)
*C09D 7/14* (2006.01)
*C09D 17/00* (2006.01)

(52) U.S. Cl. .................................. 524/497; 700/97
(58) Field of Classification Search .................. None
See application file for complete search history.

(56) References Cited

U.S. PATENT DOCUMENTS

| 3,320,198 | A | * | 5/1967 | Hill ............................ 428/511 |
| 3,945,965 | A |   | 3/1976 | Ramig, Jr. et al. |
| 4,069,186 | A |   | 1/1978 | Ramig |
| 4,283,320 | A | * | 8/1981 | Carroll et al. ................ 524/522 |
| 4,322,325 | A | * | 3/1982 | Esser et al. .................. 523/457 |
| 4,403,866 | A |   | 9/1983 | Falcoff et al. |
| 4,539,258 | A |   | 9/1985 | Panush |
| 5,851,541 | A | * | 12/1998 | Corey et al. ................. 424/401 |
| 6,221,145 | B1 |  | 4/2001 | McClain |
| 6,531,537 | B2 | * | 3/2003 | Friel et al. .................. 524/497 |

(Continued)

FOREIGN PATENT DOCUMENTS

| CA | 2166290 | 11/1995 |
| JP | 2-45578 A | * | 2/1990 |

OTHER PUBLICATIONS

Grundfelt–Forsius, "Paint Production by Component Mixing," Faerg Lack Scand. (1997) 43(2), pp. 5–6, translation from Swedish.*

(Continued)

*Primary Examiner* — Alan Diamond

(57) ABSTRACT

A paint manufacturing method includes receiving each of a group of fluid prepaints at different inputs of a fluid component mixing system, determining at a computer system a first fluid prepaint ratio, and mixing the fluid prepaints in accordance with the first ratio to form a base paint at an output of the mixing system. A paint manufacturing system includes a computer-controlled prepaint mixing system. The prepaint mixing system includes multiple fluid inputs providing for computer-controllable flow of prepaints into the mixing system. The computer system includes a memory storing software instructions that configured the computer system to receive user input selecting a base paint to be produced, determine a ratio of fluid prepaints needed to produce the base paint, and regulate each fluid flow control to establish, in the determined ratio, a flow of fluid prepaints entering the fluid mixing system. A paint manufacturing system includes multiple paint manufacturing sites that can each produce paint products. Each manufacturing site includes a site control computer to control a paint manufacturing process at the site and the system also includes a coordinating computer system that can exchange manufacturing operations data with each of the site control computers.

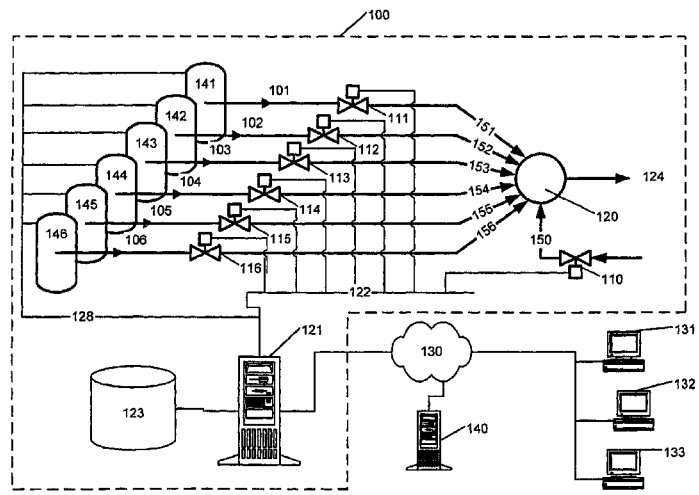

U.S. PATENT DOCUMENTS

| | | | |
|---|---|---|---|
| 6,838,087 B1 * | 1/2005 | Day | 424/401 |
| 6,969,190 B1 | 11/2005 | McClain et al. | |
| 7,065,429 B1 | 6/2006 | McClain et al. | |
| 7,132,470 B2 | 11/2006 | McClain et al. | |
| 7,250,464 B2 | 7/2007 | Friel et al. | |

OTHER PUBLICATIONS

BASF Corporation, Acronal Optive 220, 2003, Charlotte NC.

Superior Materials distributor for Akzo Nobel Cellulosic Specialities: Bermocoll; http://www.supmat.com/smi-prod.htm; Mar. 12, 2009; pp. 1–5.

Hawley's Condensed Chemical Dictionary Thirteenth Edition; John Wiley & Sons, Inc. publisher, 1997; p. 507.

Patton T., "Paint Flow And Pigment Dispersion", A Rheological Approach to Coating and Ink Technology 2nd Edition, 170–193, (1979).

Webster's Third New International Dictionary, Merriam-Webster ,Inc., Publishers, 804, (1986).

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *